(12) United States Patent
Oda et al.

(10) Patent No.: US 8,591,372 B2
(45) Date of Patent: *Nov. 26, 2013

(54) CONTINUOUSLY VARIABLE TRANSMISSION APPARATUS AND AIR CONDITIONING SYSTEM HAVING THE SAME

(75) Inventors: Shuzo Oda, Kariya (JP); Takashi Kaneko, Nagoya (JP); Yoshiharu Katano, Anjo (JP); Takuji Harada, Hekinan (JP); Kazuki Iwaya, Kasugai (JP)

(73) Assignee: Denso Corporation, Kariya (JP)

( * ) Notice: Subject to any disclaimer, the term of this patent is extended or adjusted under 35 U.S.C. 154(b) by 357 days.

This patent is subject to a terminal disclaimer.

(21) Appl. No.: 13/066,391

(22) Filed: Apr. 13, 2011

(65) Prior Publication Data

US 2011/0252819 A1 Oct. 20, 2011

(30) Foreign Application Priority Data

Apr. 14, 2010 (JP) .................................. 2010-92961
Jan. 19, 2011 (JP) .................................... 2011-9099

(51) Int. Cl.
*F16H 3/70* (2006.01)

(52) U.S. Cl.
USPC .......................................... 475/170; 475/172

(58) Field of Classification Search
USPC ................................. 475/169–172
See application file for complete search history.

(56) References Cited

U.S. PATENT DOCUMENTS

| 5,674,144 | A | * | 10/1997 | Wiley ............................ 475/170 |
| 5,685,794 | A | * | 11/1997 | Willmot ......................... 475/170 |
| 6,024,664 | A | * | 2/2000 | Shaffner ......................... 475/185 |
| 6,171,210 | B1 | | 1/2001 | Miyata et al. |
| 6,327,926 | B1 | * | 12/2001 | Chilman ........................... 74/117 |
| 7,549,357 | B2 | * | 6/2009 | Hammerbeck .................. 74/640 |
| 2006/0073047 | A1 | | 4/2006 | Ohya et al. |
| 2006/0272343 | A1 | | 12/2006 | Takahashi et al. |

FOREIGN PATENT DOCUMENTS

| JP | 61-140664 | 6/1986 |
| JP | 62-155366 | 7/1987 |
| JP | 1-169169 | 7/1989 |
| JP | 7-243506 | 9/1995 |
| JP | 2004-66858 | 3/2004 |
| JP | 2006-105030 | 4/2006 |
| JP | 2006-152982 | 6/2006 |
| JP | 2006-327385 | 12/2006 |

OTHER PUBLICATIONS

Office action dated Sep. 11, 2012 in corresponding JP Application No. 2011-9099.

\* cited by examiner

*Primary Examiner* — Tisha Lewis
(74) *Attorney, Agent, or Firm* — Harness, Dickey & Pierce, PLC

(57) ABSTRACT

An output-side swing arm is adapted to be swung about a swing axis thereof when the output-side swing arm is urged by a corresponding part of an input-side swing arm, which is driven by a force transmitted from an input shaft. An adjusting mechanism adjusts an amount of swing of the output-side swing arm by changing a location of a point of action of the input-side swing arm relative to the output-side swing arm in a radial direction of the swing axis of the input-side swing arm.

18 Claims, 18 Drawing Sheets

CONTINUOUSLY VARIABLE TRANSMISSION APPARATUS AND AIR CONDITIONING SYSTEM HAVING THE SAME

CROSS REFERENCE TO RELATED APPLICATION

This application is based on and incorporates herein by reference Japanese Patent Application No. 2010-92961 filed on Apr. 14, 2010 and Japanese Patent Application No. 2011-9099 filed on Jan. 19, 2011.

BACKGROUND OF THE INVENTION

1. Field of the Invention

The present invention relates to a continuously variable transmission apparatus and an air conditioning system having the same.

2. Description of Related Art

Japanese Unexamined Patent Publication No. S61-140664A teaches a continuously variable transmission apparatus, which can adjust an input-to-output speed ratio between an input rotational speed and an output rotational speed of the continuously variable transmission apparatus by changing the amount of eccentricity of an eccentric cam arrangement. In this continuously variable transmission apparatus, the eccentric cam arrangement, which has the variable amount of eccentricity relative to an input shaft, is provided to rotate integrally with the input shaft, and a plurality of crankshafts is rotatably placed one after another along an imaginary circle, which is coaxial with the input shaft. An end part of each crankshaft is slidably received in a corresponding cam groove of the eccentric cam arrangement. Furthermore, a plurality of planetary gears is provided such that each planetary gear is connected to the corresponding crankshaft through a corresponding one-way clutch and is meshed with a ring gear, which is connected to an output shaft to rotate the same.

The eccentric cam arrangement includes an inner eccentric cam and an outer eccentric cam. The inner eccentric cam is fixed to the input shaft, and the outer eccentric cam is rotatable relative to the input shaft. Specifically, the outer eccentric cam is connected a differential gear, the planetary gears, a worm wheel, a worm and a handle. When the handle is rotated, the outer eccentric cam is rotated relative to the inner eccentric cam. In this way, the amount of eccentricity of the eccentric cam arrangement, which is rotated integrally with the input shaft, relative to the input shaft is adjusted.

With the above structure, when the amount of eccentricity of the eccentric cam arrangement relative to the input shaft becomes small, the input-to-output speed ratio becomes small. In contrast, when the amount of eccentricity of the eccentric cam arrangement relative to the input shaft becomes large, the input-to-output speed ratio becomes large. Thereby, the input-to-output speed ratio can be adjusted linearly (continuously, i.e., steplessly).

However, in the above continuously variable transmission apparatus, when the input-to-output speed ratio is adjusted, the amount of eccentricity of the eccentric cam arrangement, which is rotated integrally with the input shaft, is changed. Therefore, a rotational balance disadvantageously varies from one input-to-output speed ratio to another input-to-output speed ratio. Furthermore, the differential gear, the planetary gears, the worm wheel, the worm, and the handle are provided to adjust the amount of eccentricity of the eccentric cam arrangement, which is rotated integrally with the input shaft, relative to the input shaft. Therefore, the number of the components is disadvantageously increased, resulting in an increased complexity of the structure.

SUMMARY OF THE INVENTION

The present invention addresses the above disadvantages. According to the present invention, there is provided a continuously variable transmission apparatus, which includes an input shaft, an output shaft, an input-side swing arm, a support member, a rotation-to-swing converting mechanism, an output-side swing arm, a swing-to-rotation converting mechanism and an adjusting mechanism. The input shaft is adapted to be rotated by an external rotational force. The output shaft is adapted to be rotated by a force transmitted from the input shaft. The input-side swing arm is adapted to be swung about a swing axis thereof by the force transmitted from the input shaft. The input-side swing arm is swingably supported by the support member. The rotation-to-swing converting mechanism converts a single directional rotational motion of the input shaft into a swing motion of the input-side swing arm. The output-side swing arm is adapted to be swung about a swing axis thereof when the output-side swing arm is urged by a corresponding part of the input-side swing arm. The swing-to-rotation converting mechanism converts a swing motion of the output-side swing arm into a single directional rotational motion of the output shaft. The adjusting mechanism adjusts an amount of swing of the output-side swing arm by changing a location of a point of action of the input-side swing arm relative to the output-side swing arm in a radial direction of the swing axis of the input-side swing arm.

According to the present invention, there is also provided an air conditioning system, which includes the continuously variable transmission apparatus, a compressor and means for controlling an operation of the adjusting mechanism. The compressor is driven by an output of the continuously variable transmission apparatus to suction and compress refrigerant. The adjusting mechanism is adapted to adjust the location of the point of action of the input-side swing arm to a zero point location where a radial distance, which is measured from the swing axis of the input-side swing arm to the location of the point of action in the radial direction of the swing axis, is minimized to limit the swing motion of the output-side swing arm when the input-side swing arm is swung by the force transmitted from the input shaft. The means for controlling the operation of the adjusting mechanism controls the adjusting mechanism at time of starting the compressor such that a torque, which is exerted at the continuously variable transmission apparatus, becomes equal to or smaller than a normal operational torque of the continuously variable transmission apparatus.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
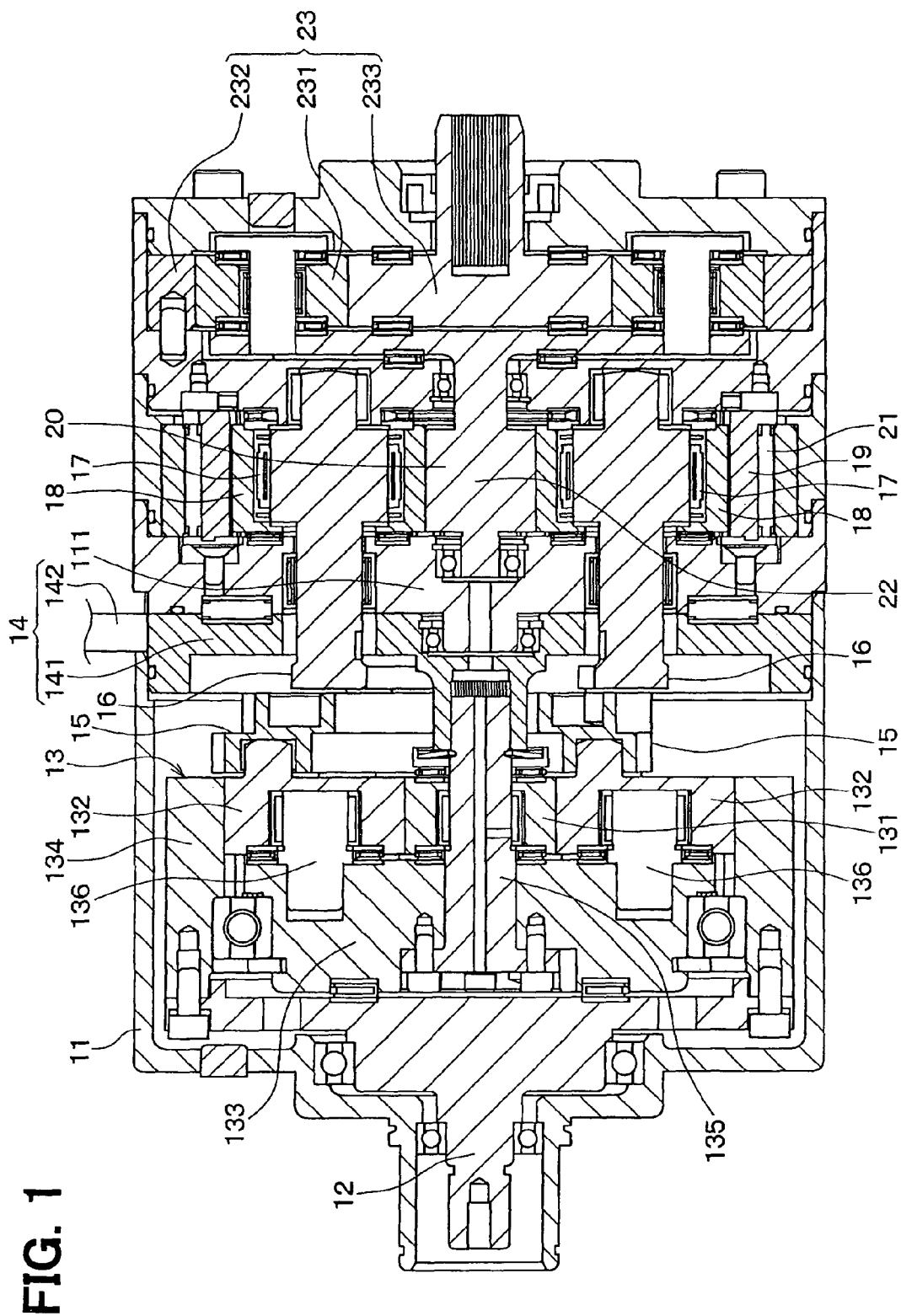
FIG. 1 is a cross-sectional view of a continuously variable transmission apparatus according to a first embodiment of the present invention.
Figure 2:
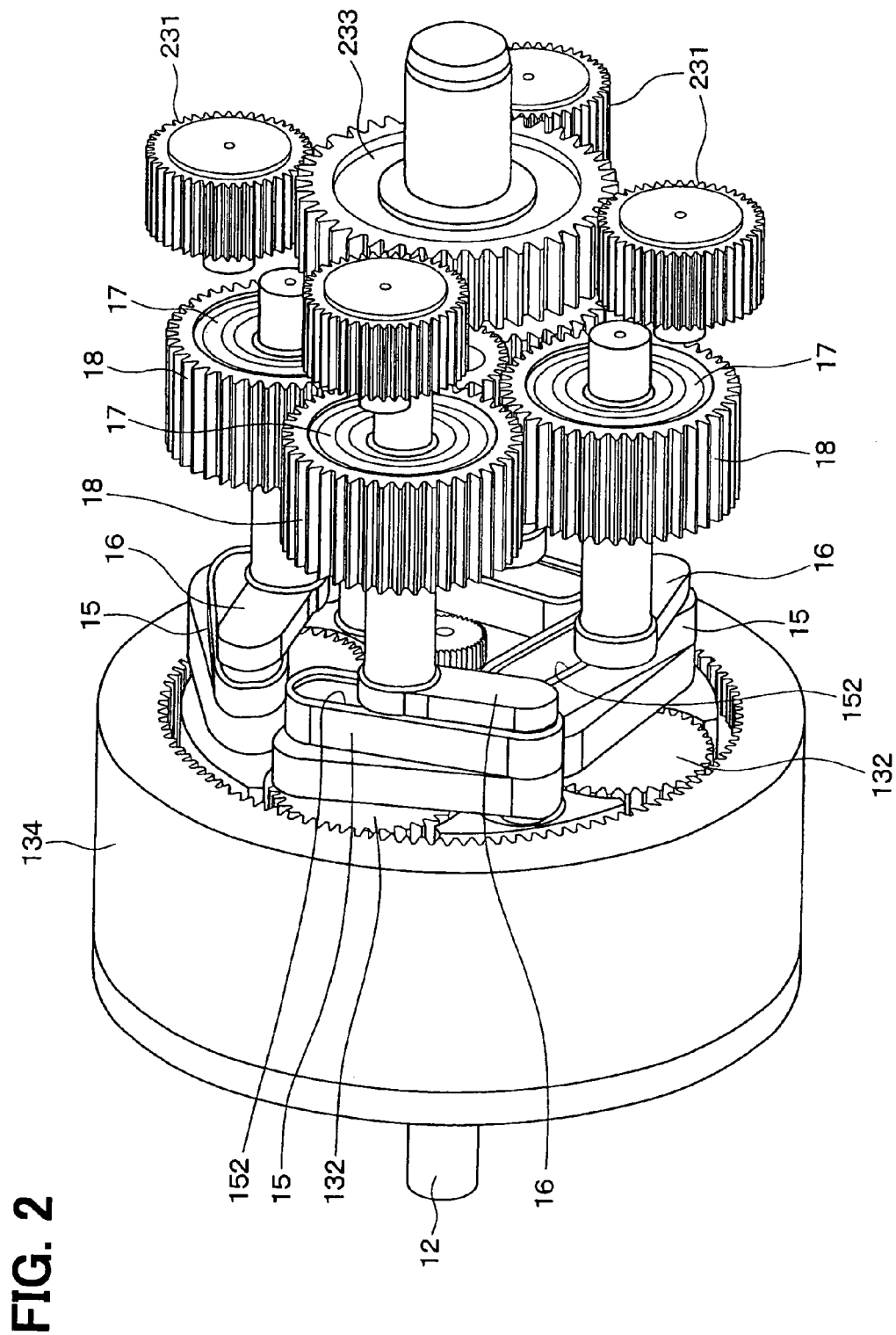
FIG. 2 is a perspective view showing an internal structure of the continuously variable transmission apparatus of FIG. 1, which is placed in a state where an input-to-output speed ratio is 0 (zero)

In a first embodiment of the present invention, a continuously variable transmission apparatus of the present invention is applied to a compressor of a refrigeration cycle. FIG. 1 is a cross sectional view of the continuously variable transmission apparatus of the present embodiment. FIG. 2 is a perspective view showing a main feature of an internal structure of the continuously variable transmission apparatus shown in FIG. 1.

As shown in FIGS. 1 and 2, the continuously variable transmission apparatus includes a housing 11, an input shaft 12 and a planetary gear mechanism 13. The housing 11 is configured into a hollow cylindrical body. The input shaft 12 is supported in an inside of the housing 11 in such a manner that the input shaft 12 is rotatable relative to the housing 11. The planetary gear mechanism 13 is coupled to the input shaft 12 in the inside of the housing 11. The housing 11 is formed by assembling a plurality of constituent housing members, which are separately molded to ease the molding process thereof and the assembling of components installed therein.

The planetary gear mechanism 13 includes a sun gear 131, a plurality of planetary gears 132, a carrier 133 and an internal gear 134. The sun gear 131 and the internal gear 134 are coaxial with the input shaft 12.

The internal gear 134 is fixed to the input shaft 12 with bolts to rotate integrally with the input shaft 12. The number of the planetary gears 132 is four in this embodiment.

A shaft 135 and a plurality of shafts 136 are fixed to the carrier 133. The shaft 135 rotatably supports the sun gear 131, and the shafts 136 rotatably support the planetary gears 132, respectively. The position of the carrier 133 is adjustably fixed relative to the housing 11 through an adjusting mechanism 14.

The adjusting mechanism 14 is provided to rotate the carrier 133 coaxially with the sun gear 131 and the internal gear 134 to enable fixation of the rotational angle of the carrier 133 relative to the housing 11 at a corresponding angle within a predetermined angular range.

Specifically, the adjusting mechanism 14 includes a circular disk member 141 and a handle 142. The circular disk member 141 is coaxial with the carrier 133. The handle 142 radially outwardly projects from an outer peripheral part of the circular disk member 141 through a wall surface of the housing 11 to the outside of the housing 11. The circular disk member 141 is fixed to the shaft 135 and is rotatably supported by a partition wall portion 111, which is formed integrally in an axial intermediate part of the housing 11.

The rotational angle of the carrier 133 can be adjusted linearly (continuously, i.e., steplessly) by rotating the circular disk member 141 through manipulation of the handle 142 at the outside of the housing 11. The manipulation of the handle 142 is performed with an electric actuator (not shown), which is placed at the outside of the housing 11. Alternatively, the handle 142 may be manipulated with a hand of a user.

The carrier 133 serves as a support member, which supports a plurality of input-side swing arms 15 in a pivotable manner (swingable manner). The number of the input-side swing arms 15 is the same number (four in this embodiment) as that of the planetary gears 132. Each of the input-side swing arms 15 is swung through rotation of a corresponding one of the planetary gears 132.

Figure 3:
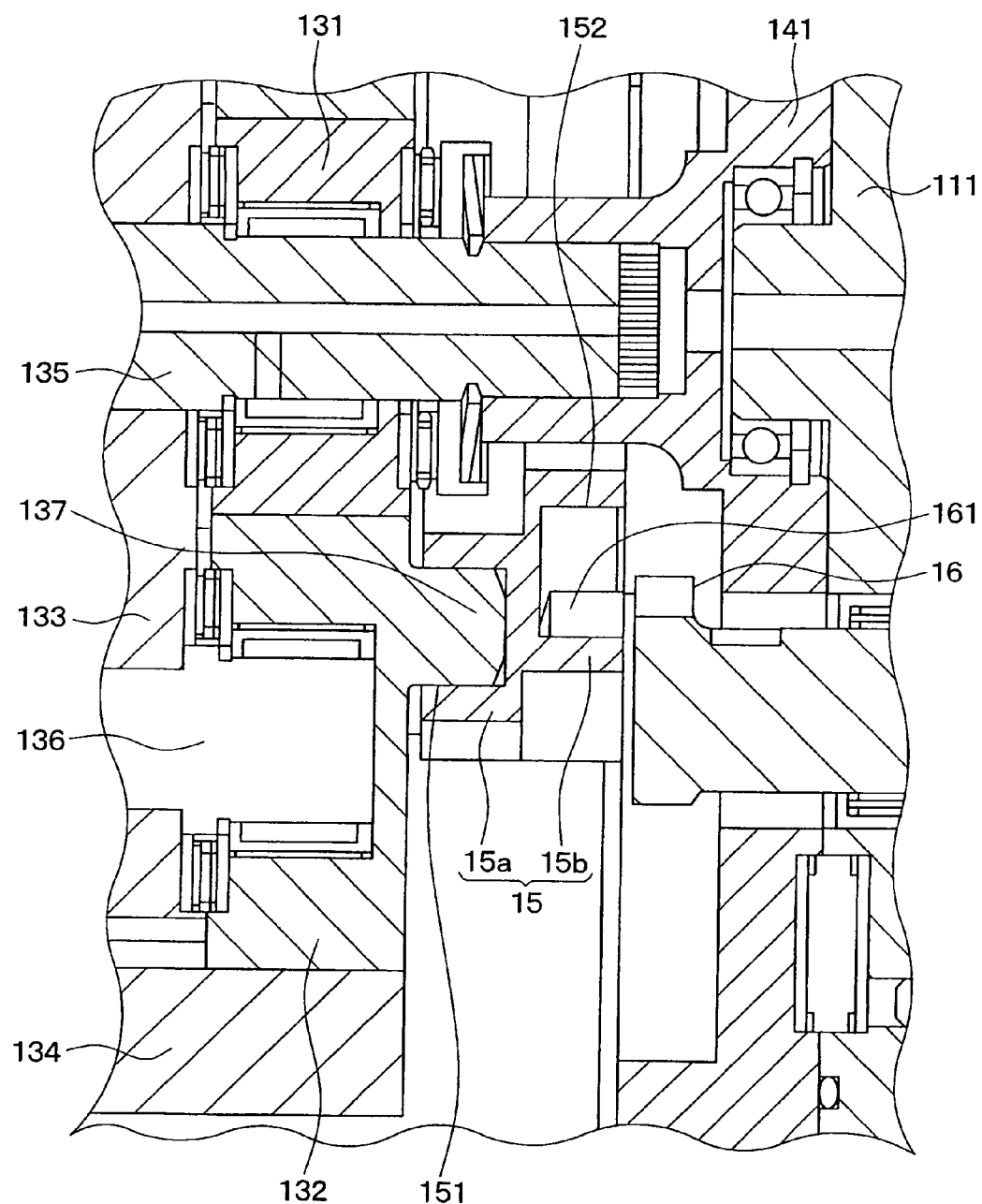
FIG. 3 is a partial enlarged cross-sectional view of FIG. 1.
Figure 4:
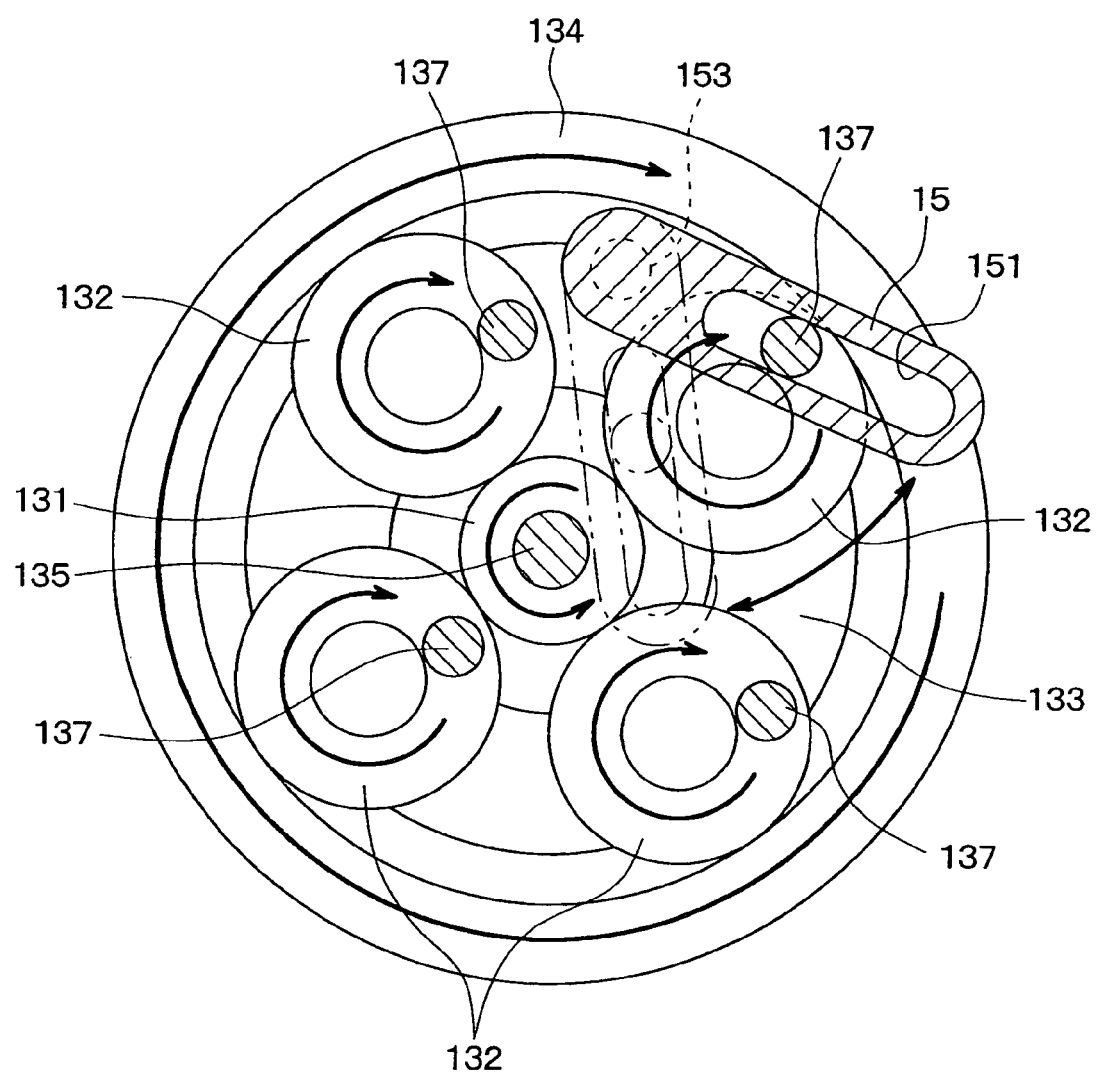
FIG. 4 is a schematic front view showing a planetary gear mechanism and one of input-side swing arms of the continuously variable transmission apparatus.

FIG. 3 is an enlarged view of a main feature shown in FIG. 1. FIG. 4 is a front view schematically showing the planetary gear mechanism 13 and the input-side swing arms 15 (only one of the input-side swing arms 15 being shown in FIG. 4 for the sake of simplicity). As shown in FIGS. 3 and 4, a drive pin 137, which is formed integrally with the corresponding planetary gear 132, is slidably received in a first groove 151 of the corresponding input-side swing arm 15. In this way, the planetary gear mechanism 13 serves as a rotation-to-swing converting mechanism, which converts the rotational motion (single directional rotational motion) of the input shaft 12 to the swing motions of the input-side swing arms 15.

As shown in FIG. 3, each of the input-side swing arms 15 is coupled to a corresponding one of a plurality of output-side swing arms 16. Specifically, a pin 161, which is formed integrally with the corresponding output-side swing arm 16, is slidably received in a second groove 152, which is formed in the corresponding input-side swing arm 15.

As shown in FIGS. 1 and 2, a shaft of each of the output-side swing arms 16 is coupled with a corresponding one of a plurality of external gears 18 through a corresponding one-way clutch 17. The one-way clutch 17 enables rotation of the external gear 18 relative to the output-side swing arm 16 in one direction and limits (disables) rotation of the external gear 18 relative to the output-side swing arm 16 in the other direction, which is opposite from the one direction.

In other words, the one-way clutch 17 serves as a rotational force transmission limiting mechanism, which limits the transmission of the rotational force from the shaft of the output-side swing arm 16 to the external gear 18 in the other direction. Thus, the external gear 18 is rotated in the one direction through the swing motion of the output-side swing arm 16.

The external gears 18 are meshed with an internal gear 19 and an external gear 20. The internal gear 19 is rotatably supported by the housing 11 through bearings 21. The external gear 20 is formed integrally with an output shaft 22, which is coaxial with the input shaft 12.

Each of the one-way clutches 17, the corresponding external gear 18, the internal gear 19 and the external gear 20 cooperate together to serve as a swing-to-rotation converting mechanism, which converts the swing motions of the output-side swing arms 16 to the rotational motion of the output shaft 22.

The output shaft 22 is coupled to a speed-increasing device 23. The speed increasing device 23 includes a plurality of planetary gears 231, an internal gear 232 and a sun gear 233. The planetary gears 231 are driven to revolve upon rotation of the output shaft 22. The sun gear 233 and the internal gear 232 are meshed with the planetary gears 231. The planetary gears 231, the internal gear 232 and the sun gear 233 of the speed-increasing device 23 are received in the housing 11. The internal gear 232 of the speed-increasing device 23 is fixed to the housing 11. An output shaft of the speed-increasing device 23 is formed integrally with the sun gear 233 of the speed-increasing device 23. In the inside of the housing 11, each corresponding one of the above components is installed through each corresponding bearing. Furthermore, the housing 11 is fluid-tightly sealed with a seal member (e.g., an O-ring).

Figure 5:
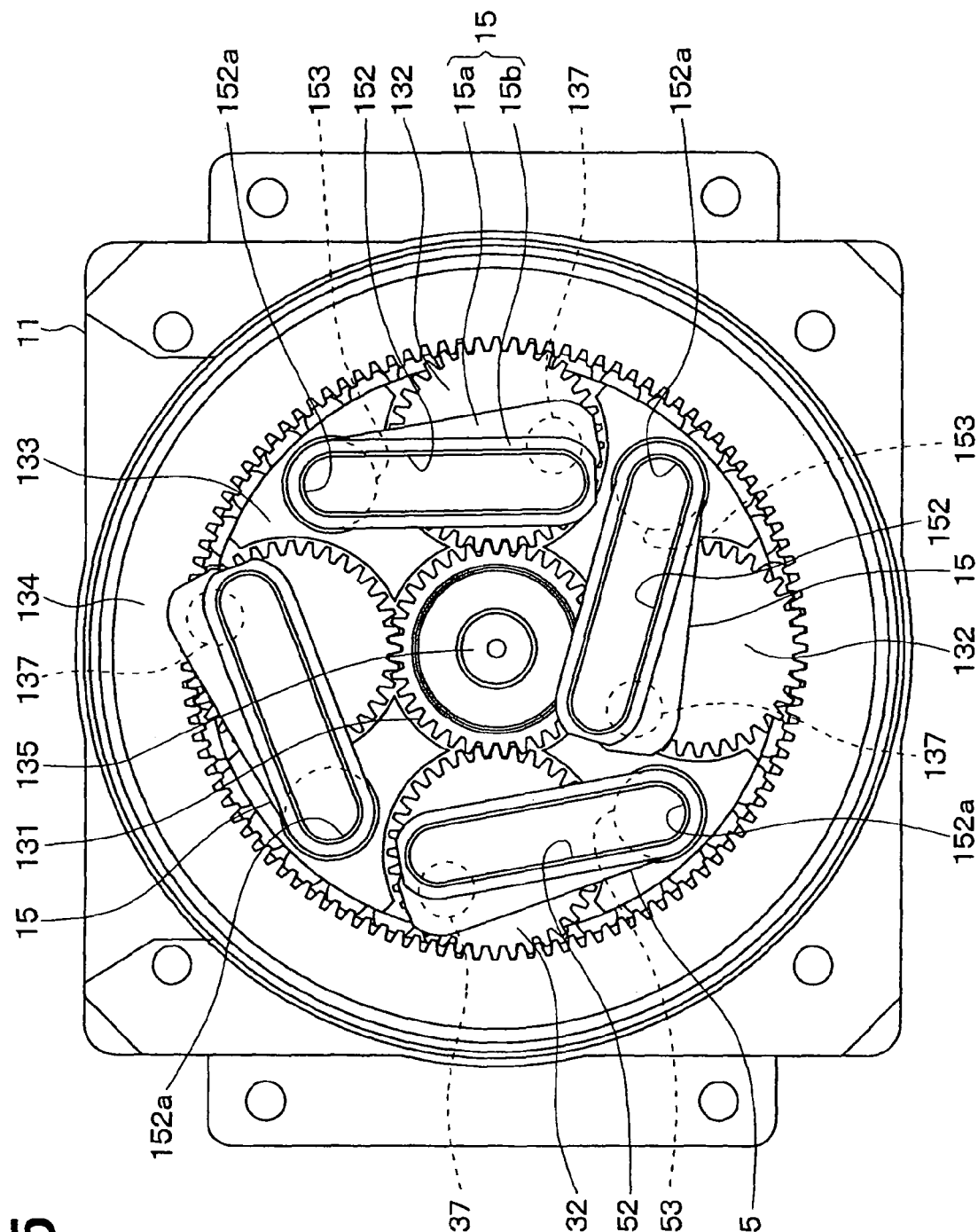
FIG. 5 is a front view showing the components of the continuously variable transmission apparatus, which are located between an input shaft and the input-side swing arms.

Next, a coupling structure, which couples between a corresponding one of the input-side swing arms 15 and a corresponding one of the output-side swing arms 16, will be described with reference to FIGS. 3 and 5. FIG. 5 is a front view taken from an axial side where the input-side swing arms 15 are located (i.e., the axial side opposite from the input shaft 12), showing the components of the continuously variable transmission apparatus located between the input shaft 12 and the input-side swing arms 15.

As shown in FIG. 3, the first groove 151 of the input-side swing arm 15 is formed in a surface of the input-side swing arm 15, which is located on an axial side where the planetary gear 132 is located. As shown in FIGS. 3 and 5, the second groove 152 of the input-side swing arm 15 is formed in an opposite surface of the input-side swing arm 15, which is located on the other axial side where the output-side swing arm 16 is located. In the present embodiment, each of the first and second grooves 151, 152 is configured into a linear form, i.e., is configured to extend linearly.

In the present embodiment, the input-side swing arm 15 includes a first arm portion 15a, in which the first groove 151 is formed, and a second arm portion 15b, in which the second groove 152 is formed. The first arm portion 15a and the second arm portion 15b are integrally formed together in such a manner that the first arm portion 15a and the second arm portion 15b are placed one after another in the axial direction.

In the present embodiment, the output-side swing arm 16 is swung about a swing axis (pivot axis) of the output-side swing arm 16. In an axial view taken in an axial direction of the swing axis of the output-side swing arm 16, the swing axis of the output-side swing arm 16 is displaced from an imaginary swing center line (not shown), which bisects a swing angular range (swingable angle) of the adjacent input-side swing arm 15.

In the axial view, the first and second arm portions 15a, 15b of the input-side swing arm 15 are arranged such that a location of one longitudinal end part of the first arm portion 15a and a location of one longitudinal end part of the second arm portion 15b coincide with each other, and the first and second arm portions 15a, 15b are progressively displaced from each other toward the other longitudinal end parts of the first and second arm portions 15a, 15b. Thus, the first groove 151 and the second groove 152 of the input-side swing arm 15 are non-parallel to each other.

Thereby, a point of action of the input-side swing arm 15 relative to the output-side swing arm 16 is located on a side of the first groove 151 of the input-side swing arm 15 where the swing axis of the output-side swing arm 16 is located.

Thus, in the axial view, even though the swing axis of the output-side swing arm 16 is deviated from the imaginary swing center line of the input-side swing arm 15, a direction of an imaginary swing center line (not shown), which bisects a swing angular range of the output-side swing arm 16, can be set to be generally parallel to the imaginary swing center line of the input-side swing arm 15. Therefore, a change in a swing angular speed of the output-side swing arm 16 can be made small. As a result, a change in a speed (rotational speed) of rotation of the output shaft 22, which is outputted from the swing-to-rotation converting mechanism, can be made small.

In the present embodiment, the swing axis of the output-side swing arm 16 is placed on the side of the first groove 151 of the input-side swing arm 15 where the output shaft 22 is located, i.e., where the center of the swing-to-rotation converting mechanism is located. Therefore, the second groove 152 of the input-side swing arm 15 is located on the side of the first groove 151 where the output shaft 22 is located, i.e., where the center of the swing-to-rotation converting mechanism is located. The first groove 151 and the second groove 152 may be configured to be parallel to each other, if desired.

Figure 6:
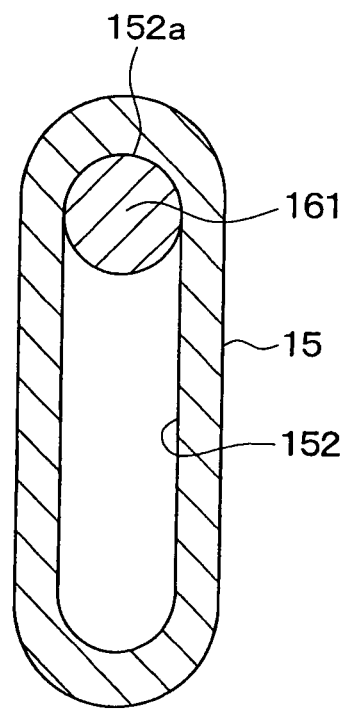
FIG. 6 is a planar view showing a first arm portion of the input-side swing arm of the first embodiment.

The shaft 153 of the input-side swing arm 15 is formed in the one end part of the first arm portion 15a. In the axial view, the one longitudinal end part 152a of the second groove 152 is overlapped with the shaft 153 of the input-side swing arm 15. In the present embodiment, as shown in FIG. 6, the second groove 152 is configured to a corresponding shape, in which a substantial relief gap (a gap larger than a required slide gap) is not provided between the inner peripheral wall surface of the second groove 152 and the outer peripheral wall surface of the pin 161 of the output-side swing arm 16.

Next, the operation of the above-described structure will be described. In the state where the position of the carrier 133 is fixed at the predetermined rotational angle relative to the housing 11 through the adjusting mechanism 14, when the input shaft 12 is rotated in the one direction by an external force, the rotational motion of the input shaft 12 is converted to the swing motions of the input-side swing arms 15 through the planetary gear mechanism 13.

Specifically, when the input shaft 12 is rotated, the internal gear 134 is also rotated together with the input shaft 12, so that each planetary gear 132 is rotated about its rotational axis without the revolution thereof. When the planetary gear 132 is rotated about its rotational axis, the drive pin 137 of the planetary gear 132 revolves about the rotational axis of the planetary gear 132, so that the input-side swing arm 15 is swung about its swing axis. When the input-side swing arm 15 is swung, the pin 161 of the output-side swing arm 16 is urged by a wall surface of the second groove 152 of the input-side swing arm 15, so that the output-side swing arm 16 is also swung about its swing axis.

When the output-side swing arm 16 is swung, the swing motion of the output-side swing arm 16 is converted into a single directional rotational motion of the output shaft 22 through the swing-to-rotation converting mechanism 17-20. Specifically, when the output-side swing arm 16 is swung, the external gear 18 is rotated in the one rotational direction through the one-way clutch 17, so that the external gear 20 and the output shaft 22 are rotated in the one rotational direction. The speed of rotation of the output shaft 22 is increased through the speed-increasing device 23.

Figure 7:
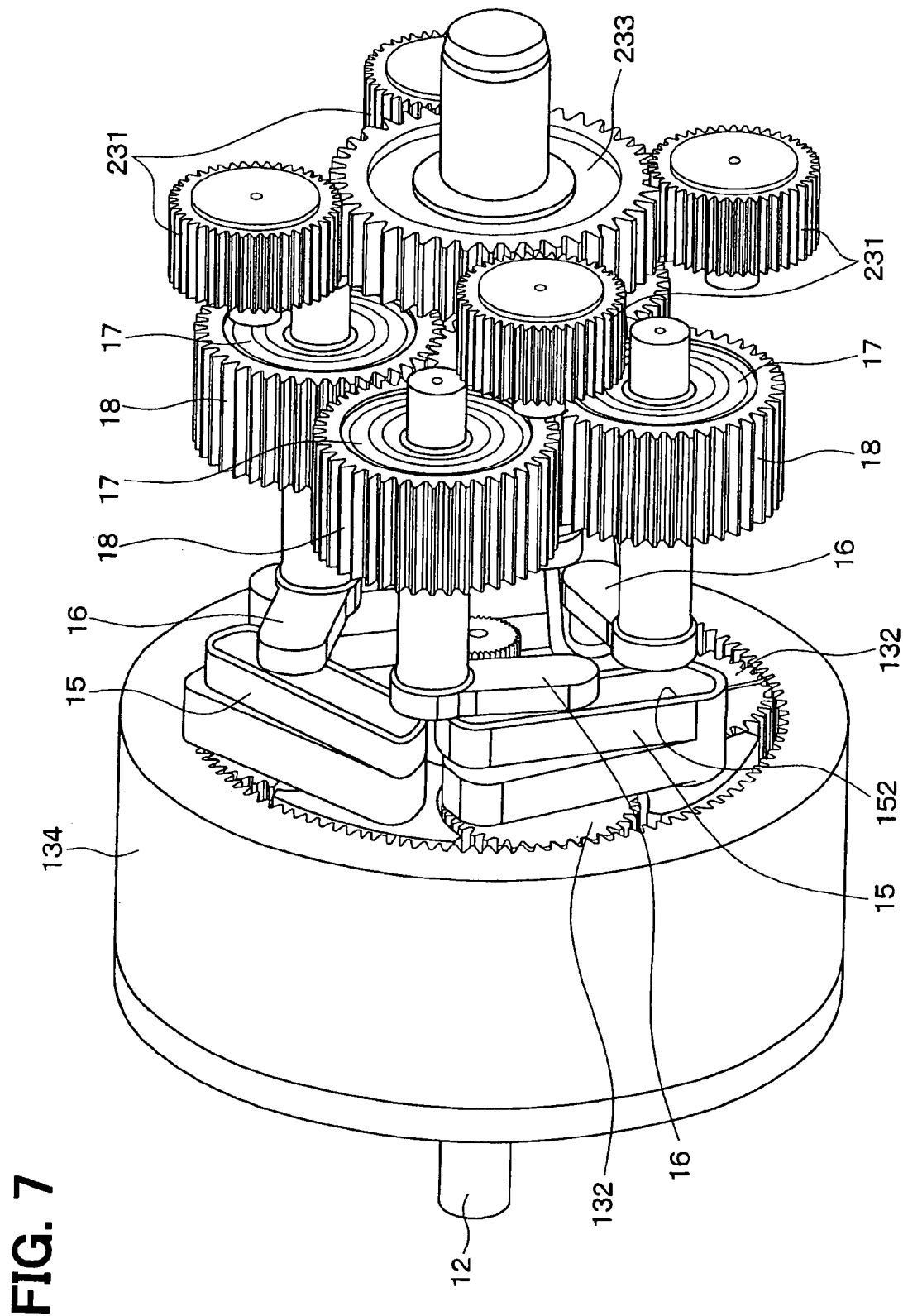
FIG. 7 is a perspective view showing the internal structure of the continuously variable transmission apparatus of FIG. 1, which is placed in a state where the input-to-output speed ratio is a maximum input-to-output speed ratio.
Figure 8:
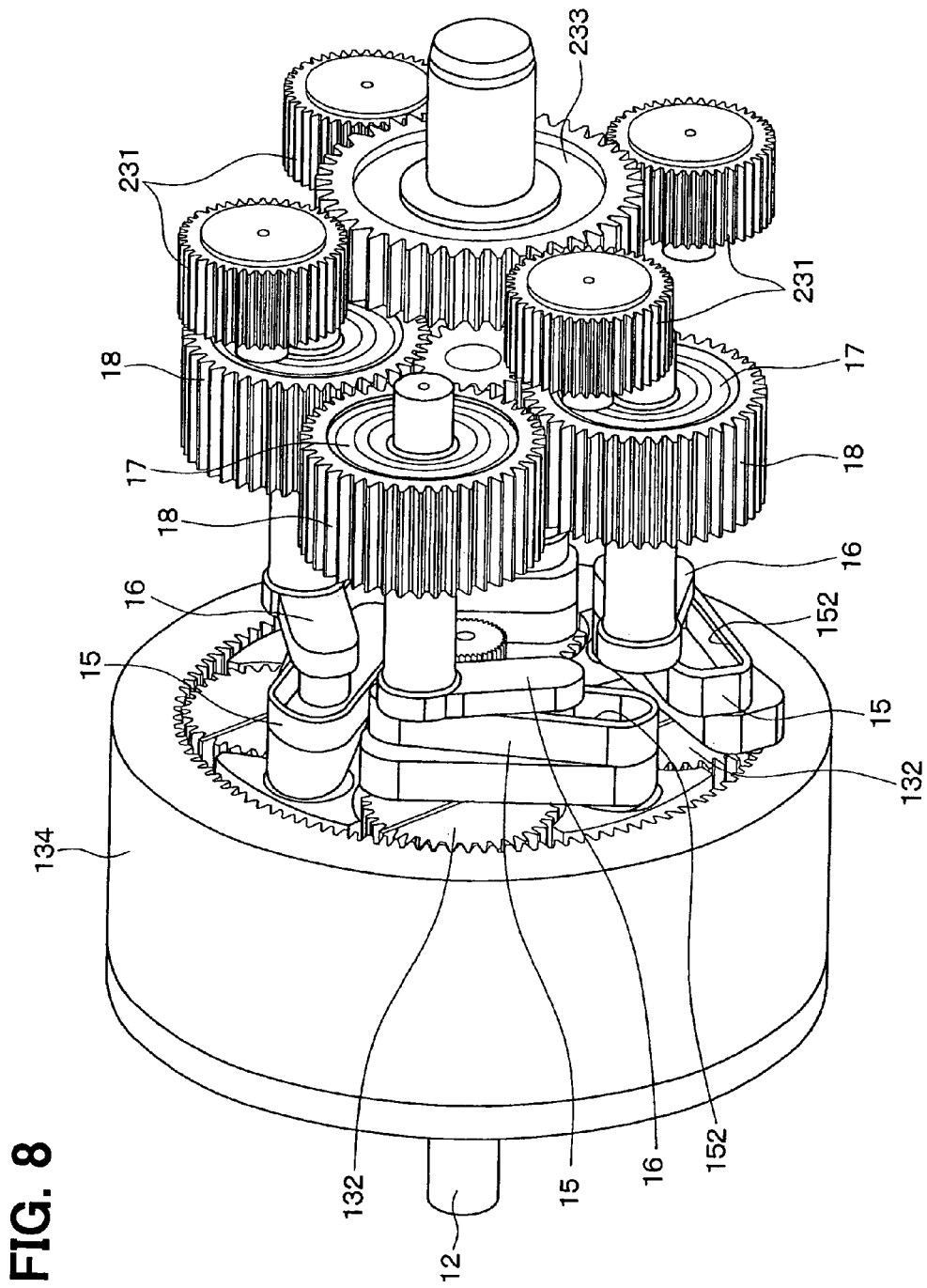
FIG. 8 is a perspective view showing the internal structure of the continuously variable transmission apparatus of FIG. 1, which is placed in a state where the input-to-output speed ratio is a middle input-to-output speed ratio.

At the time of adjusting an input-to-output speed ratio (speed increasing ratio) in the above-described structure, the rotational angle of the carrier 133 is adjusted through the adjusting mechanism 14. FIG. 2 shows a state, in which the rotational angle of the carrier 133 is adjusted to set the input-to-output speed ratio (the input-to-output speed ratio=output rotational speed/input rotational speed) to zero (0). FIG. 7 shows a state, in which the rotational angle of the carrier 133 is adjusted to set the input-to-output speed ratio to a maximum input-to-output speed ratio. FIG. 8 shows a state, in which the rotational angle of the carrier 133 is adjusted to set the input-to-output speed ratio to a middle input-to-output speed ratio, which is between the minimum input-to-output speed ratio (i.e., zero) and the maximum input-to-output speed ratio.

When the rotational angle of the carrier 133 is changed, the point of action of the input-side swing arm 15 relative to the output-side swing arm 16 is changed. Thus, the amount of swing of the output-side swing arm 16 relative to the amount of swing of the input-side swing arm 15 is changed, and thereby the rotational speed (the output rotational speed) of the output shaft 22 is changed.

The stepless adjustment (linear adjustment or continuous adjustment) of the rotational angle of the carrier 133 is made possible, so that the rotational speed (output rotational speed) of the output shaft 22 relative to the rotational speed (input rotational speed) of the input shaft 12 can be linearly (continuously, i.e., steplessly) adjusted. Thus, the input-to-output speed ratio can be linearly (continuously, i.e., steplessly) adjusted.

Specifically, in the state (the input-to-output speed ratio=0) shown in FIG. 2, the point of action of the input-side swing arm 15 is closest to the shaft 153 of the input-side swing arm 15, and the distance between the shaft 153 and the point of action of the input-side swing arm 15 measured in the longitudinal direction of the input-side swing arm 15, i.e., in the radial direction of the swing axis of the input-side swing arm 15 is substantially 0 (zero). In other words, the point of action of the input-side swing arm 15 is located in a zero point location where a radial distance, which is measured from the swing axis of the input-side swing arm 15 to the location of the point of action in the radial direction of the swing axis, is minimized to limit the swing motion of the output-side swing arm 16 when the input-side swing arm 15 is swung by the force transmitted from the input shaft 12. For instance, the radial distance, which is measured from the swing axis of the input-side swing arm 15 to the location of the point of action in the radial direction of the swing axis, may be substantially zero or close to zero (e.g., the radial distance being generally equal to or smaller than a radius of the shaft 153 of the input-side swing arm 15 shown in FIG. 5). Therefore, even when the input-side swing arm 15 is swung, the output-side swing arm 16 does not swing, so that the input-to-output speed ratio becomes 0.

In the state (the input-to-output speed ratio=maximum) shown in FIG. 7, the distance between the shaft 153 of the input-side swing arm 15 and the point of action of the input-side swing arm 15 measured in the longitudinal direction (the radial direction of the swing axis of the input-side swing arm 15) of the input-side swing arm 15 becomes maximum. Thereby, the amount of swing of the output-side swing arm 16 relative to the amount of swing of the input-side swing arm 15 becomes maximum, so that the input-to-output speed ratio becomes the maximum input-to-output speed ratio.

In the state (input-to-output speed ratio=the middle input-to-output speed ratio) shown in FIG. 8, the distance between the shaft 153 of the input-side swing arm 15 and the point of action of the input-side swing arm 15 measured in the longitudinal direction (the radial direction of the swing axis) of the input-side swing arm 15 is generally a middle value between the minimum value and the maximum value. Thereby, the amount of swing of the output-side swing arm 16 relative to the amount of swing of the input-side swing arm 15 becomes generally a middle value, so that the input-to-output speed ratio becomes the middle input-to-output speed ratio.

According to the present embodiment, the input-to-output speed ratio is changed by changing the location of the point of action of the input-side swing arm 15 relative to the output-side swing arm 16. Therefore, even when the input-to-output speed ratio is changed, the rotational balance does not change. Thus, it is possible to limit the change in the rotational balance at each corresponding speed ratio.

Furthermore, at the time of adjusting the input-to-output speed ratio, it is only required to adjust the location of the input-side swing arm 15, which does not rotate integrally with the input shaft 12. Therefore, the number of the components of the adjusting mechanism 14 can be minimized. Specifically, the adjusting mechanism 14 is the simple mechanism, which changes the relative position of the carrier (support member) 133 relative to the output-side swing arm 16. Therefore, the structure of the continuously variable transmission apparatus can be simplified.

Second Embodiment

Figure 9:
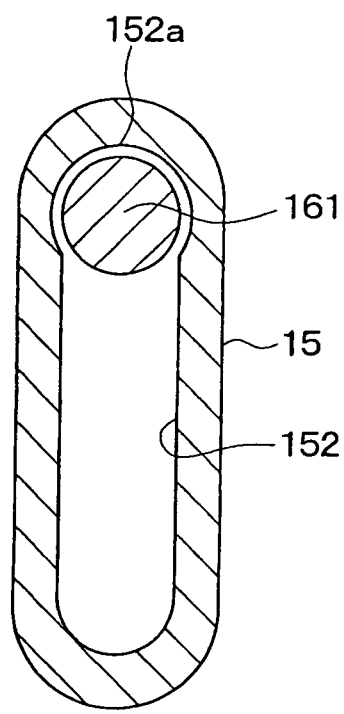
FIG. 9 is a planar view showing a first arm portion of an input-side swing arm according to a second embodiment of the present invention.

In the first embodiment, the second groove 152 of the input-side swing arm 15 does not have the substantial relief gap relative to the pin 161 of the output-side swing arm 16. In contrast, according to the second embodiment, as shown in FIG. 9, the one longitudinal end part 152a of the second groove 152 has a relief gap forming shape, which provides a relief gap between the inner peripheral wall surface of the one longitudinal end part 152a of the second groove 152 and the outer peripheral wall surface of the pin 161. Specifically, the relief gap forming shape of the one longitudinal end part 152a of the second groove 152 is larger than the outer shape of the pin 161. In other words, the inner peripheral wall surface of the one longitudinal end part 152a of the second groove 152 is configured as a generally arcuate surface, and an inner diameter of the inner peripheral wall surface of the one longitudinal end part 152a is larger than the outer diameter of the pin 161 by a predetermined amount.

The size of the relief forming shape (the inner peripheral wall surface) of the one longitudinal end part 152a of the second groove 152 is determined in view of a positional tolerance of the input-side swing arm 15, which is determined based on, for example, manufacturing errors and/or operational errors. The rest of the second groove 152, which is other than the one longitudinal end part 152a, is shaped such that a substantial relief gap is not formed between the rest of the second groove 152 and the pin 161.

In the case where the point of action of the input-side swing arm 15 relative to the output-side swing arm 16 is adjusted to the location (zero point location), at which the input-to-output speed ratio becomes zero, the pin 161 of the output-side swing arm 16 is placed in the one longitudinal end part 152a of the second groove 152.

Here, in the case where the second groove 152 does not have the relief gap forming shape like in the case of FIG. 6, when the location of the input-side swing arm 15 varies within the tolerance range thereof, the output-side swing arm 16 may be slightly swung by the swing motion of the input-side swing arm 15. Therefore, in such a case, the input-to-output speed ratio cannot be reliably held to zero.

With respect to this point, according to the present embodiment, as shown in FIG. 9, the relief gap forming shape is provided in the second groove 152. Therefore, it is possible to absorb the positional tolerance of the input-side swing arm 15 to limit the swing motion of the output-side swing arm 16. In other words, the one longitudinal end part 152a of the second groove 152, which has the relief gap forming shape, serves as a tolerance absorbing portion, which absorbs the positional tolerance at the time of adjusting the location of the point of action of the input-side swing arm 15 to the zero point location. Therefore, the input-to-output speed ratio can be reliably set to 0 (zero) by absorbing the positional tolerance of the input-side swing arm 15.

Third Embodiment

Figure 10A:
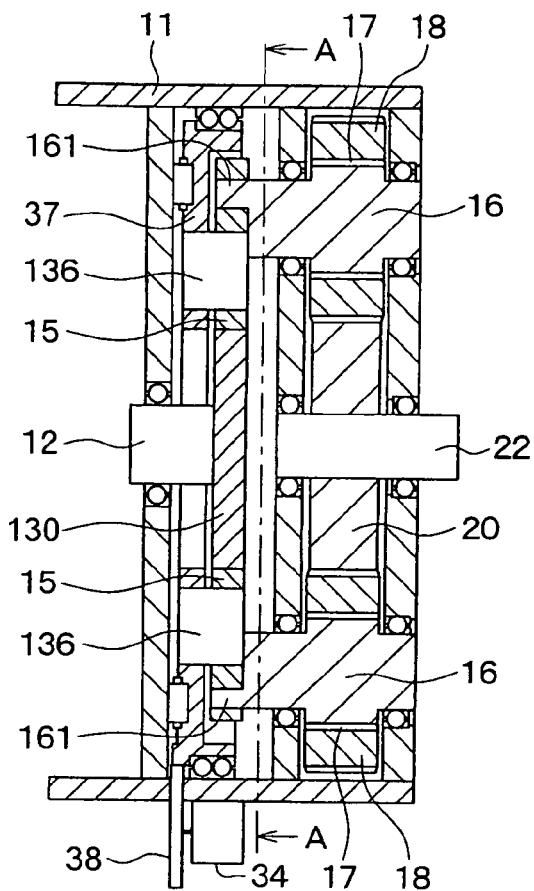
FIG. 10A is a partial cross-sectional view showing a rotation-to-swing converting mechanism according to a third embodiment of the present invention.
Figure 10B:
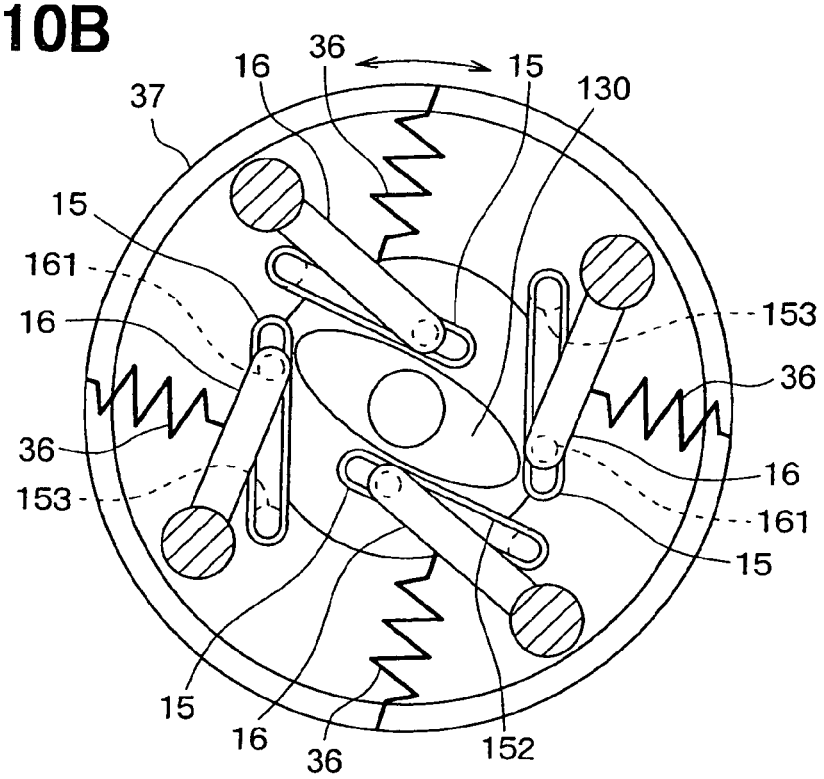
FIG. 10B is a cross-sectional view taken along line A-A in FIG. 10A.

In the first embodiment, the rotation-to-swing converting mechanism, which converts the rotational motion of the input shaft 12 to the swing motion of the input-side swing arm 15, is formed with the planetary gear mechanism 13. In contrast, according to a third embodiment of the present invention, as shown in FIGS. 10A and 10B, the rotation-to-swing converting mechanism is formed with an eccentric cam 130 and a plurality of resilient members 36. The eccentric cam 130 is joined to the input shaft 12. Each of the resilient members 36 is provided to a corresponding one of the output-side swing arms 16.

The eccentric cam 130 is placed such that each corresponding input-side swing arms 15 slides on a cam surface of the eccentric cam 130. The input-side swing arms 15 are pivotably (swingably) supported by a support member 37, which is configured into an annular plate. The support member 37 is fixed to the housing 11 through an adjusting mechanism 38.

The adjusting mechanism 38 rotates the support member 37 in a coaxial manner relative to the input shaft 12 to linearly (continuously, i.e., steplessly) adjust the rotational angle of the support member 37 within a predetermined range. In the case of FIGS. 10A and 10B, the adjusting mechanism 38 is driven by an electric actuator 34, which is placed at the outside of the housing 11.

Each resilient member 36 is fixed to the housing 11 such that the resilient member 36 urges the corresponding output-side swing arm 16 against the corresponding input-side swing arm 15.

Next, the operation of the above-described structure will be described. In the state where the position of the support member 37 is fixed at the predetermined rotational angle relative to the housing 11 through the adjusting mechanism 38, when the input shaft 12 is rotated in the one direction, the rotational motion of the input shaft 12 is converted into the swing motions of the input-side swing arms 15 through the eccentric cam 130.

Specifically, when the input shaft 12 is rotated, the eccentric cam 130 is eccentrically rotated. Thereby, each corresponding input-side swing arm 15 is urged by the cam surface of the eccentric cam 130, so that the input-side swing arm 15 urges the corresponding output-side swing arm 16. The output-side swing arm 16, which is urged by the input-side swing arm 15, is urged backward by the resilient restoring force of the corresponding resilient member 36, so that the input-side swing arm 15 is urged backward against the cam surface of the eccentric cam 130. In this way, the input-side swing arm 15 is swung, and thereby the corresponding output-side swing arm 16 is also swung.

When the output-side swing arm 16 is swung, the swing motion of the output-side swing arm 16 is converted into the rotational motion of the output shaft 22 in the one rotational direction through the swing-to-rotation converting mechanism 17-20.

With the above-described structure, at the time of adjusting the input-to-output speed ratio, the rotational angle of the support member 37 is adjusted through the adjusting mechanism 38. The location of the point of action of the input-side swing arm 15 relative to the output-side swing arm 16 is changed by changing the rotational angle of the support member 37. Therefore, similar to the first embodiment, the input-to-output speed ratio can be linearly (continuously, i.e., steplessly) adjusted.

In the present embodiment, similar to the second embodiment, the relief gap forming shape may be provided in the one longitudinal end part of the second groove 152 of the input-side swing arm 15, which overlaps with the swing shaft 153, to form the relief gap between the inner peripheral wall surface of the one end part of the second groove 152 and the outer peripheral wall surface of the pin 161. In this way, the positional tolerance of the input-side swing arm 15 can be absorbed, and thereby the input-to-output speed ratio can be reliably set to 0 (zero).

Fourth Embodiment

Figure 11:
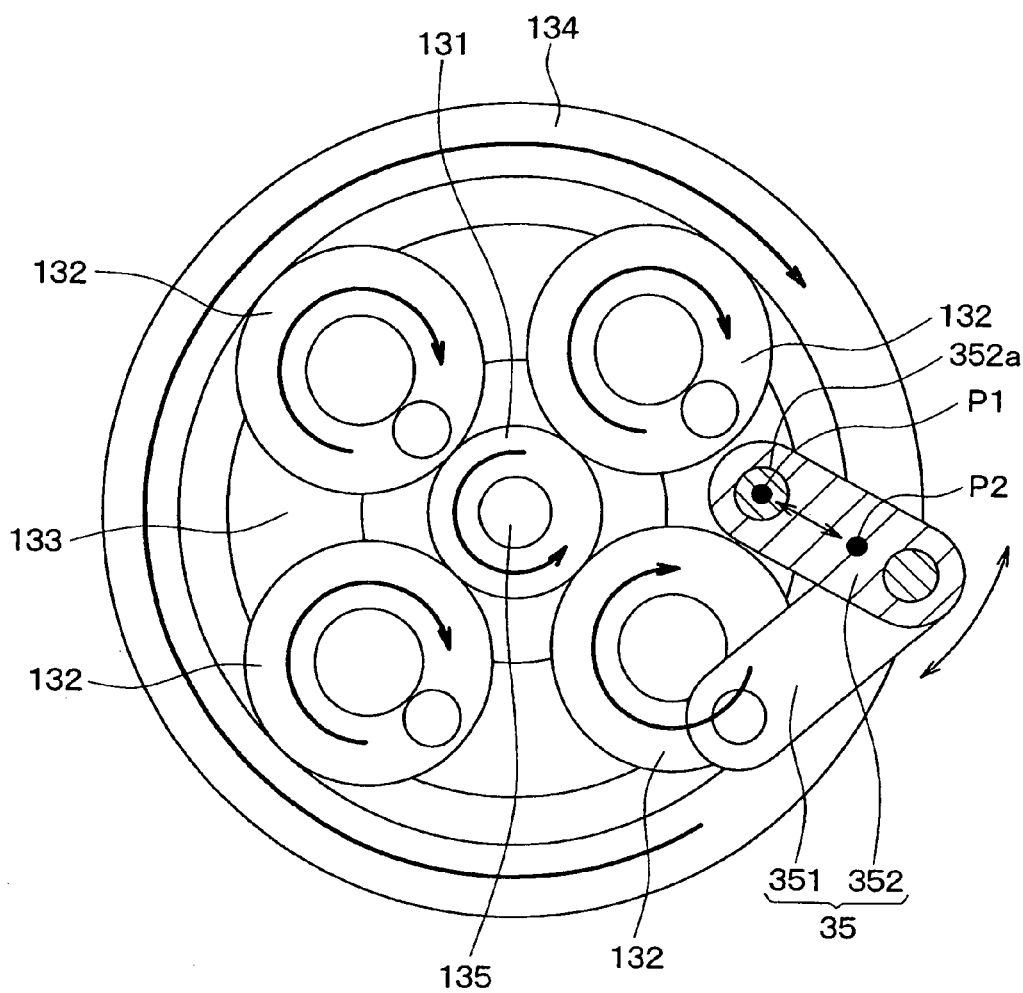
FIG. 11 is a front view showing a rotation-to-swing converting mechanism according to a fourth embodiment of the present invention.

In the first embodiment, each input-side swing arm 15 is directly connected to the corresponding planetary gear 132. Alternatively, in the fourth embodiment, a plurality of lever crank mechanisms 35, each of which includes a plurality of connecting rods 351, 352, is provided to the planetary gear mechanism 13. In FIG. 11, only one of the lever crank mechanisms 35 is depicted for the sake of simplicity. Furthermore, the connecting rod 352 of each lever crank mechanism 35, which is not directly connected to the planetary gear mechanism 13, serves as an input-side swing arm.

In the present embodiment, the number of the connecting rods 351, 352 of each lever crank mechanism 35 is two. Among these two connecting rods 351, 352, the connecting rod 351 is pivotably (swingably) supported by the corresponding planetary gear 132, and the connecting rod 352 is pivotably (swingably) supported by the carrier 133.

Although not depicted in the drawing, an opposite surface of the connecting rod (serving as the input-side swing arm) 352, which is opposite from the planetary gear 132, has a groove that extends in the longitudinal direction of the connecting rod 352 and slidably receives the pin 161 of the corresponding output-side swing arm 16.

The groove of the connecting rod 352 is formed such that one end part (one longitudinal end part) of the groove of the connecting rod 352 overlaps with a swing shaft 352a of the connecting rod 352. When the relief gap forming shape, which forms the relief gap relative to the pin 161 of the output-side swing arm 16, is provided at the one end part of this groove in a manner similar to that of the second embodiment, the positional tolerance of the connecting rod 352 can be absorbed to effectively hold the input-to-output speed ratio at 0 (zero).

In FIG. 11, a point P1 indicates the location of the pin 161 of the output-side swing arm 16 in the case where the input-to-output speed ratio is 0 (zero). In this state, the location of the pin 161 of the output-side swing arm 16 overlaps with the swing shaft 352a of the connecting rod 352.

In contrast, a point P2 of FIG. 11 indicates the location of the pin 161 of the output-side swing arm 16 in the state where the input-to-output speed ratio is the maximum input-to-output speed ratio. In this state, the location of the pin 161 of the output-side swing arm 16 is the furthermost location thereof, which is furthermost from the swing shaft 352a of the connecting rod 352.

Next, the operation of the above-described structure will be described. In the state where position of the carrier 133 is fixed at the predetermined rotational angle relative to the housing 11 through the adjusting mechanism 14, when the input shaft 12 is rotated in the one direction, the internal gear 134 is rotated. Thus, the planetary gears 132 are rotated without the revolution thereof, and thereby the lever crank mechanism 35 is driven through the rotation of the corresponding planetary gear 132. Specifically, the connecting rod 352, which serves as the input-side swing arm, is swung about the swing shaft 352a.

When the connecting rod 352, which serves as the input-side swing arm, is swung, the output-side swing arm 16 is swung. Thus, the swing motion of the output-side swing arm 16 is converted to the rotational motion of the output shaft 22 in the one direction through the swing-to-rotation converting mechanism 17-20, and the speed of the rotation of the output shaft 22 is increased.

With the above-described structure, at the time of adjusting the input-to-output speed ratio, the rotational angle of the carrier 133 is adjusted through the adjusting mechanism 14. When the rotational angle of the carrier 133 is changed, the location of the pin 161 of the output-side swing arm 16 is changed between the point P1 and the point P2, so that the point of action of the input-side swing arm (i.e., the connecting rod 352) relative to the output-side swing arm 16 is changed. In this way, similar to the first embodiment, the input-to-output speed ratio can be linearly (continuously, i.e., steplessly) adjusted.

According to the present embodiment, in comparison to the case where the input-side swing arm is directly connected to the planetary gear 132 like in the first embodiment, the amount of swing of the input-side swing arm (i.e., the connecting rod 352) can be increased, and thereby the maximum input-to-output speed ratio can be increased.

Fifth Embodiment

In the first embodiment, the rotational force of the input shaft 12 is transmitted through the path of the planetary gear 132, the input-side swing arm 15, the output-side swing arm 16, the external gear 18, the external gear 20 and the output shaft 22 in this order. In contrast, according to a fifth embodiment of the present invention shown in FIGS. 12A to 13C, the rotational force of the input shaft 12 is also distributed to a bypass shaft 30 in addition to the above path.

Figure 12A:
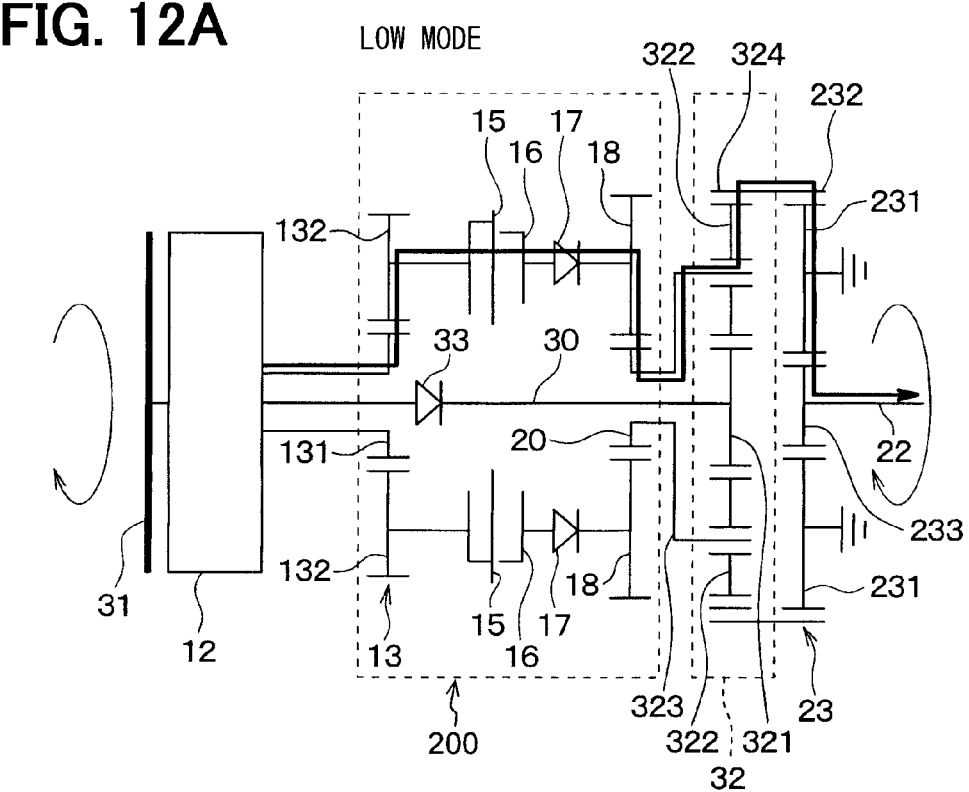
FIG. 12A is a diagram schematically showing a continuously variable transmission apparatus according to a fifth embodiment of the present invention placed in a low input-to-output speed ratio mode.
Figure 12B:
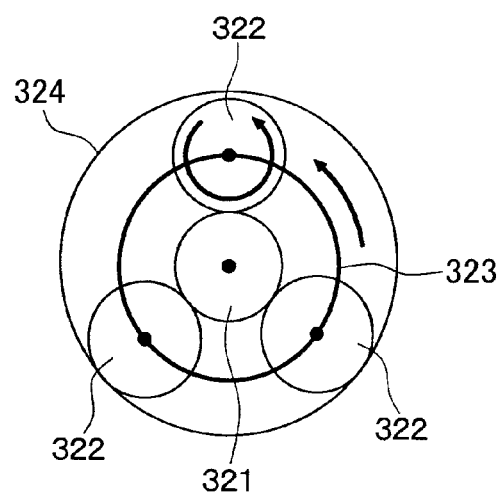
FIG. 12B is a schematic front view showing planetary gears and a sun gear of the continuously variable transmission apparatus of FIG. 12A placed in the low input-to-output speed ratio mode.
Figure 12C:
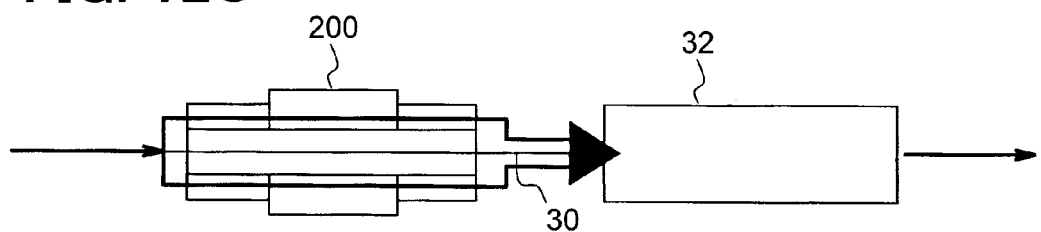
FIG. 12C is a schematic diagram showing a continuously variable transmission mechanism, a bypass shaft and a differential gear mechanism of the continuously variable transmission apparatus of FIG. 12A placed in the low input-to-output speed ratio mode.

In the continuously variable transmission apparatus of the present embodiment, the input-to-output speed ratio can be changed between a low input-to-output speed ratio mode (Low mode) and a high input-to-output speed ratio mode (High mode). FIGS. 12A to 12C show the operational state in the low input-to-output speed ratio mode (Low mode).

The bypass shaft 30 is coaxial with both of the input shaft 12 and the output shaft 22. The bypass shaft 30 axially extends through a center part of the sun gear 131 and a center part of the external gear 20 and is rotatable relative to the sun gear 131 and the output shaft 22. In the present embodiment, the sun gear 131 is rotated integrally with the input shaft 12.

The rotational force of the input shaft 12 is transmitted to the bypass shaft 30 through a clutch mechanism (coupling and decoupling mechanism) 31, which couples or decouples the bypass shaft 30 to the input shaft 12 to enable or disable the transmission of the rotational force from the input shaft 12 to the bypass shaft 30.

The bypass shaft 30 is connected to a sun gear 321 of a differential gear mechanism 32. The differential gear mechanism 32 is of a single pinion type and includes the sun gear 321, a plurality of planetary gears 322, a carrier 323 and an internal gear 324. The sun gear 321 and the planetary gears 322 are rotatably supported by the carrier 323.

The planetary gear mechanism (the rotation-to-swing converting mechanism) 13, the input-side swing arms 15, the output-side swing arms 16, the one-way clutches 17, the external gears 18, the internal gear 19 (not depicted in FIG. 12A for the sake of simplicity but shown in FIG. 1) and the external gear 20 cooperate together to form a continuously variable transmission mechanism 200. The differential gear mechanism 32 is provided between the continuously variable transmission mechanism 200 and the output shaft 22, and the speed increasing device 23 is placed between the differential gear mechanism 32 and the output shaft 22. The external gear 20 of the continuously variable transmission mechanism 200 is joined to the carrier 323 of the differential gear mechanism 32. Therefore, the carrier 323 of the differential gear mechanism 32 is rotated integrally with the external gear 20 of the continuously variable transmission mechanism.

Although not depicted in FIGS. 12A to 12C, the bypass shaft 30 is supported by the housing 11 through a one-way clutch 33, which serves as a first rotation limiting mechanism. The one-way clutch 33 limits, i.e., disables the rotation of the bypass shaft 30 in the direction, which is the same as the rotational direction of the external gear 20 of the continuously variable transmission mechanism 200 and the rotational direction of the carrier 323 of the differential gear mechanism 32. In contrast, the one-way clutch 33 enables the rotation of the bypass shaft 30 in the opposite direction, which is opposite from the rotational direction of the external gear 20 and the rotational direction of the carrier 323 of the differential gear mechanism 32.

In the present embodiment, the rotational direction, which is limited, i.e., disabled by the one-way clutch 33 is the same as the rotational direction which is limited, i.e., disabled by the one-way clutch (second rotation limiting mechanism) 17 of the continuously variable transmission mechanism 200.

The internal gear 324 of the differential gear mechanism 32 is connected to the internal gear 232 of the speed increasing device 23. Although not depicted in FIGS. 12A to 12C, the internal gear 324 of the differential gear mechanism 32 and the internal gear 232 of the speed increasing device 23 are supported by the housing 11 such that the internal gear 324 of the differential gear mechanism 32 and the internal gear 232 of the speed increasing device 23 are rotatable relative to the housing 11. The planetary gears 231 of the speed-increasing device 23 are supported by the housing 11 such that each planetary gear 231 is adapted to rotate about its rotational axis but does not revolve.

Next, the operation of the above-described structure will be described. In the low input-to-output speed ratio mode shown in FIGS. 12A to 12C, the transmission of the rotational force from the input shaft 12 to the bypass shaft 30 is blocked, i.e., disabled by the clutch mechanism 31. Therefore, when the input shaft 12 is rotated by the drive source, the rotational force of the input shaft 12 is transmitted through the path of the sun gear 131, the planetary gear 132, the input-side swing arm 15, the output-side swing arm 16, the external gear 18, the external gear 20, the carrier 323, the planetary gear 322, the internal gear 324, the speed increasing device 23 and the output shaft 22 in this order.

At this time, as shown in FIG. 12B, although each planetary gear 322 revolves and rotates, the sun gear 321 does not rotate. This is due to the following reason. That is, the rotation of the bypass shaft 30, which is joined to the sun gear 321, is limited, i.e., disabled by the one-way clutch 33.

FIG. 12C schematically shows the operation in the low input-to-output speed ratio mode. In the low input-to-output speed ratio mode, the rotational force of the input shaft 12 is transmitted to the differential gear mechanism 32 only through the continuously variable transmission mechanism 200, and the rotational force of the input shaft 12 is not distributed to the bypass shaft 30.

Figure 13A:
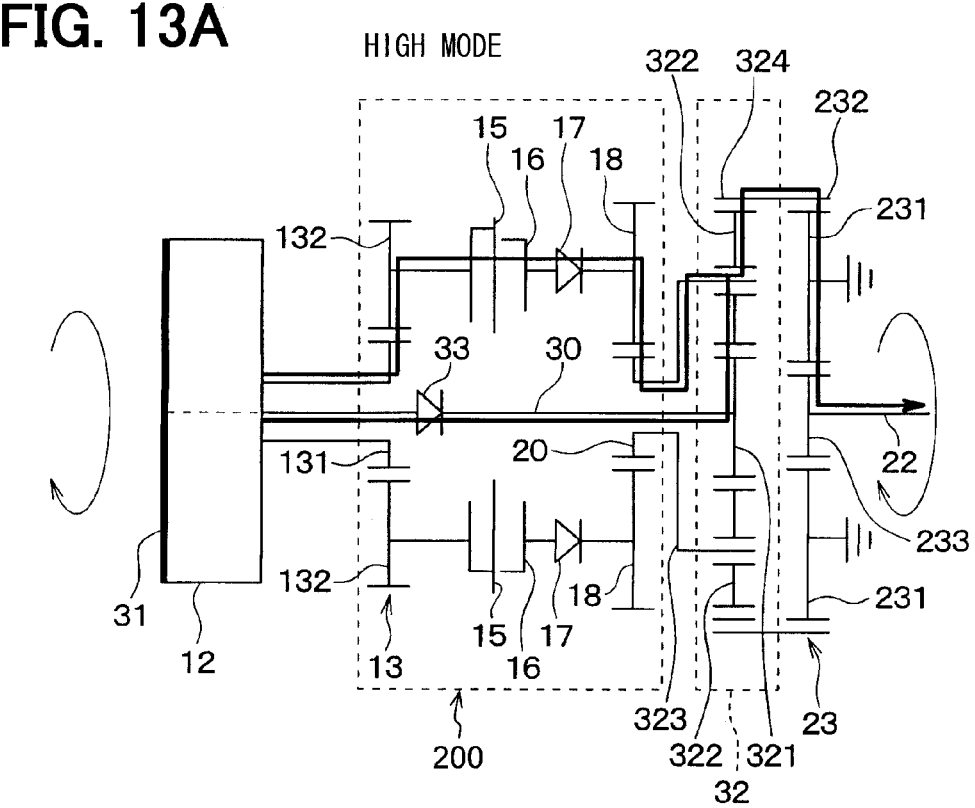
FIG. 13A is a diagram schematically showing the continuously variable transmission apparatus of the fifth embodiment placed in a high input-to-output speed ratio mode.
Figure 13B:
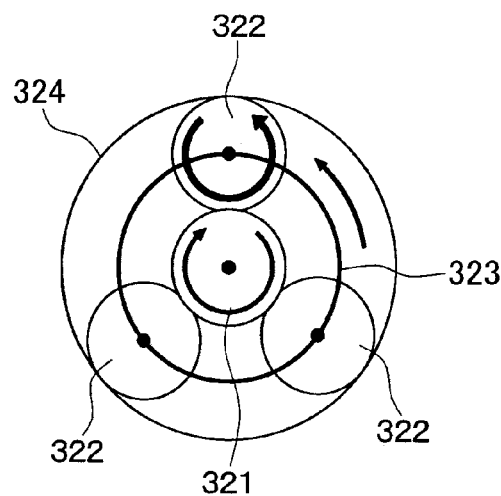
FIG. 13B is a schematic front view showing the planetary gears and the sun gear of the continuously variable transmission apparatus of FIG. 13A placed in the high input-to-output speed ratio mode.
Figure 13C:
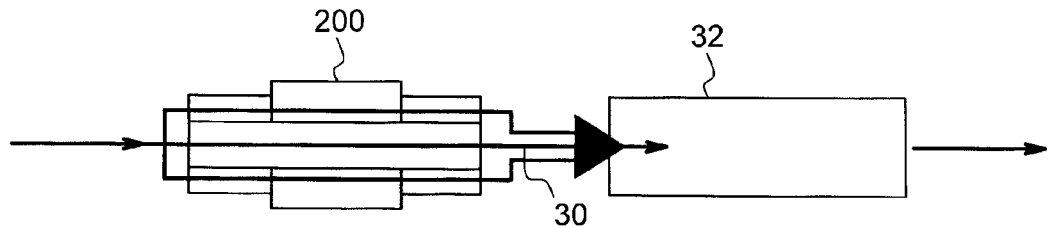
FIG. 13C is a schematic diagram showing the continuously variable transmission mechanism, the bypass shaft and the differential gear mechanism of the continuously variable transmission apparatus of FIG. 13A placed in the high input-to-output speed ratio mode.

In contrast, in the high input-to-output speed ratio mode (high mode) shown in FIGS. 13A to 13C, the rotational force of the input shaft 12 is transmitted to the bypass shaft 30 through the clutch mechanism 31. Therefore, the rotational force of the input shaft 12 is also transmitted through the path of the bypass shaft 30, the sun gear 321, the planetary gear 322, the internal gear 324, the speed increasing device 23 and the output shaft 22 in this order in addition to the transmission path of the low input-to-output speed ratio mode.

At this time, as shown in FIG. 13B, the sun gear 321 is rotated in the direction opposite from the carrier 323, so that the speed of the rotation of the planetary gear 322 is increased in comparison to that of the planetary gear 322 in the low input-to-output speed ratio mode. Thus, the rotational speed of the internal gear 324 is increased in comparison to the rotational speed of the internal gear 324 in the low input-to-output speed ratio mode. In other words, the input-to-output speed ratio is increased in comparison to that of the low input-to-output speed ratio mode.

FIG. 13C schematically shows the operation in the high input-to-output speed ratio mode (high mode). In the high input-to-output speed ratio mode (high mode), the drive force of the input shaft 12 is distributed to the continuously variable transmission mechanism 200 and the bypass shaft 30 and are then transmitted to the differential gear mechanism 32. Therefore, the load applied to the continuously variable transmission mechanism 200 can be alleviated to improve the durability thereof.

Figure 14A:
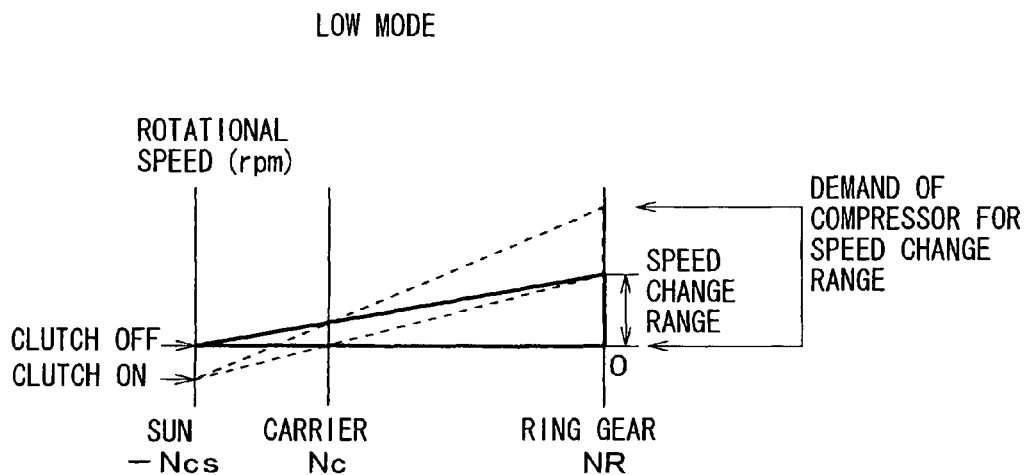
FIG. 14A is a diagram indicating an alignment chart of the continuously variable transmission apparatus of the fifth embodiment placed in the low input-to-output speed ratio mode.
Figure 14B:
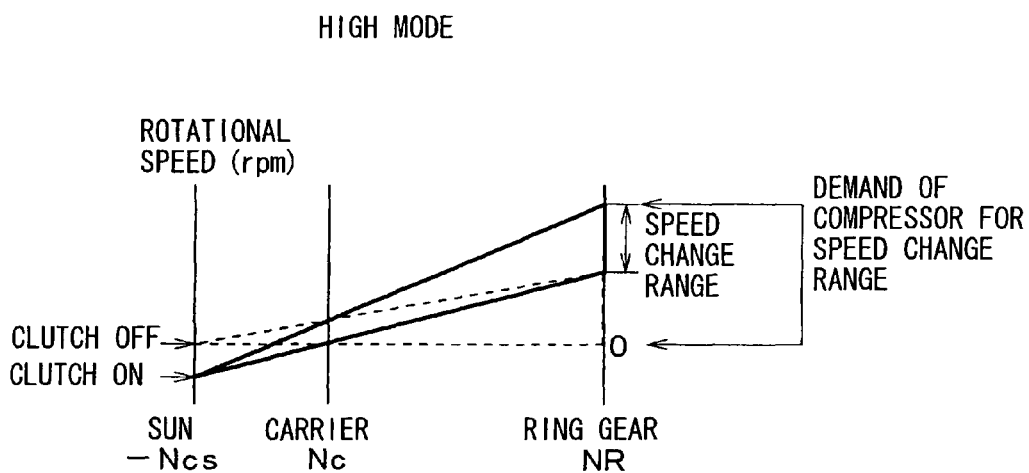
FIG. 14B is a diagram indicating an alignment chart of the continuously variable transmission apparatus of the fifth embodiment placed in the high input-to-output speed ratio mode.

FIG. 14A shows an alignment chart of the low input-to-output speed ratio mode (low mode), and FIG. 14B shows an alignment chart of the high input-to-output speed ratio mode (high mode). In FIG. 14A, the alignment chart of the high input-to-output speed ratio mode (high mode) is indicated by a dotted line for comparative purpose. In FIG. 14B, the alignment chart of the low input-to-output speed ratio mode (low mode) is indicated by a dotted line for comparative purpose.

In the low input-to-output speed ratio mode (low mode), the sun gear 321 (see SUN in FIG. 14A) does not rotate. In contrast, in the high input-to-output speed ratio mode (high mode), the sun gear 321 (see SUN in FIG. 14B) is rotated in the opposite direction that is opposite from the rotational direction of the carrier 323 (thereby the rotational speed becomes negative), so that the rotational speed of the internal gear (ring gear) 324 is increased in comparison to the rotational speed of the internal gear (ring gear) 324 in the low input-to-output speed ratio mode (low mode). Therefore, in the high input-to-output speed ratio mode (high mode), the obtainable range of the input-to-output speed ratio (input-to-output speed ratio range) is increased in comparison to that of the low input-to-output speed ratio mode (low mode).

According to the present embodiment, in the high input-to-output speed ratio mode (high mode), the rotation, which is inputted from the bypass shaft 30 to the sun gear 321 of the differential gear mechanism 32, is opposite from the rotation, which is inputted from the continuously variable transmission mechanism 200 to the carrier 323 of the differential gear mechanism 32. Therefore, the power recirculation does not occur. Thus, a mechanical loss, which is caused by the power recirculation, does not occur, and thereby the efficiency is high.

Furthermore, the bypass shaft 30 is coaxial with both of the input shaft 12 and the output shaft 22. Thereby, even though the bypass shaft 30 is provided, it is possible to avoid an increase in the size of the entire apparatus in the radial direction of the continuously variable transmission mechanism 200.

Sixth Embodiment

In a sixth embodiment of the present invention, the continuously variable transmission apparatus of each of the above embodiments is applied to a compressor of an air conditioning system of a vehicle (e.g., an automobile), and the sixth embodiment relates to a input-to-output speed ratio control operation for controlling the input-to-output speed ratio at a start time period of the compressor (i.e., the time of starting the compressor).

Figure 15:
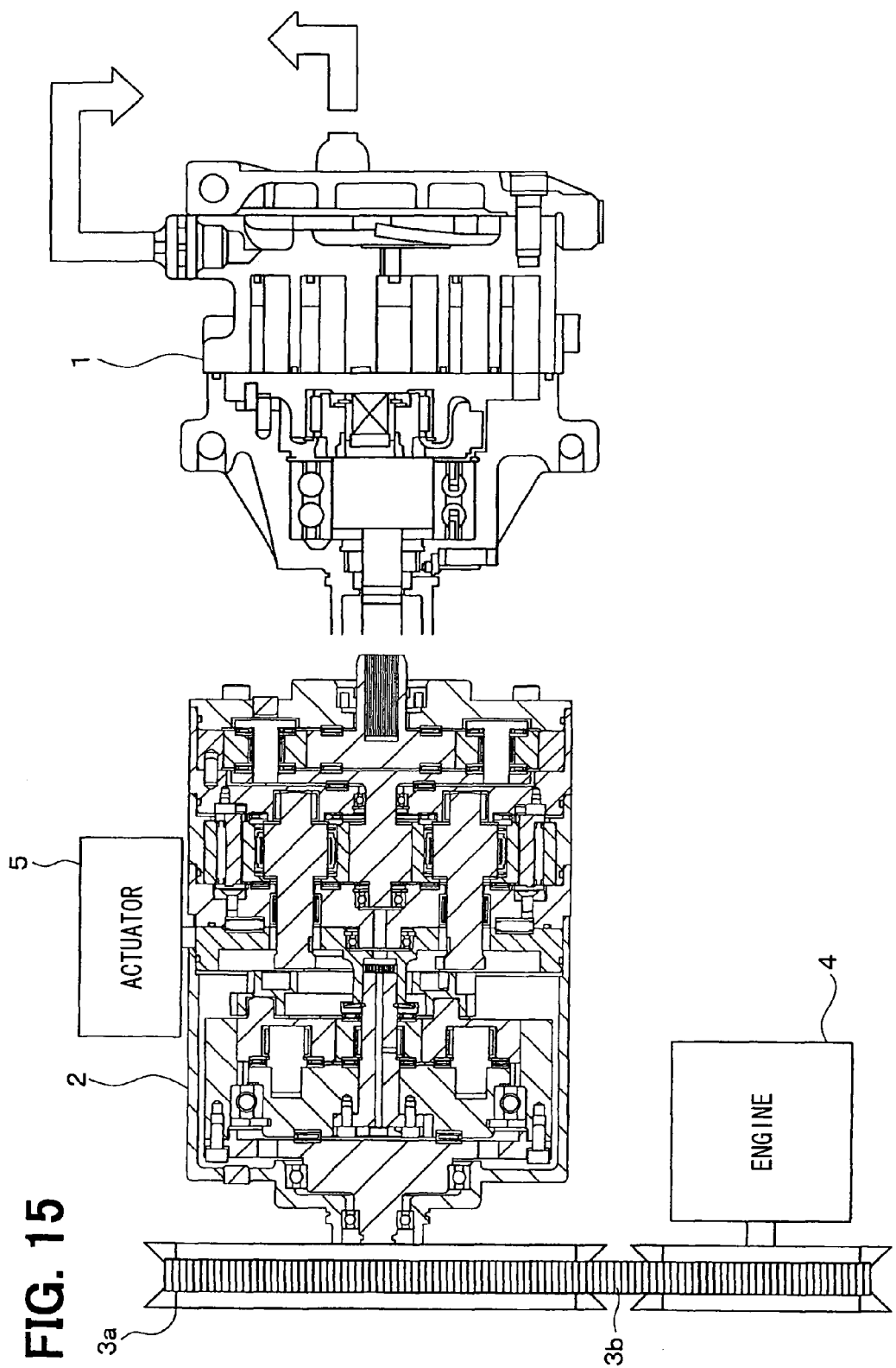
FIG. 15 is a schematic view showing a main structure of a vehicle air conditioning system according to a sixth embodiment of the present invention.
Figure 16:
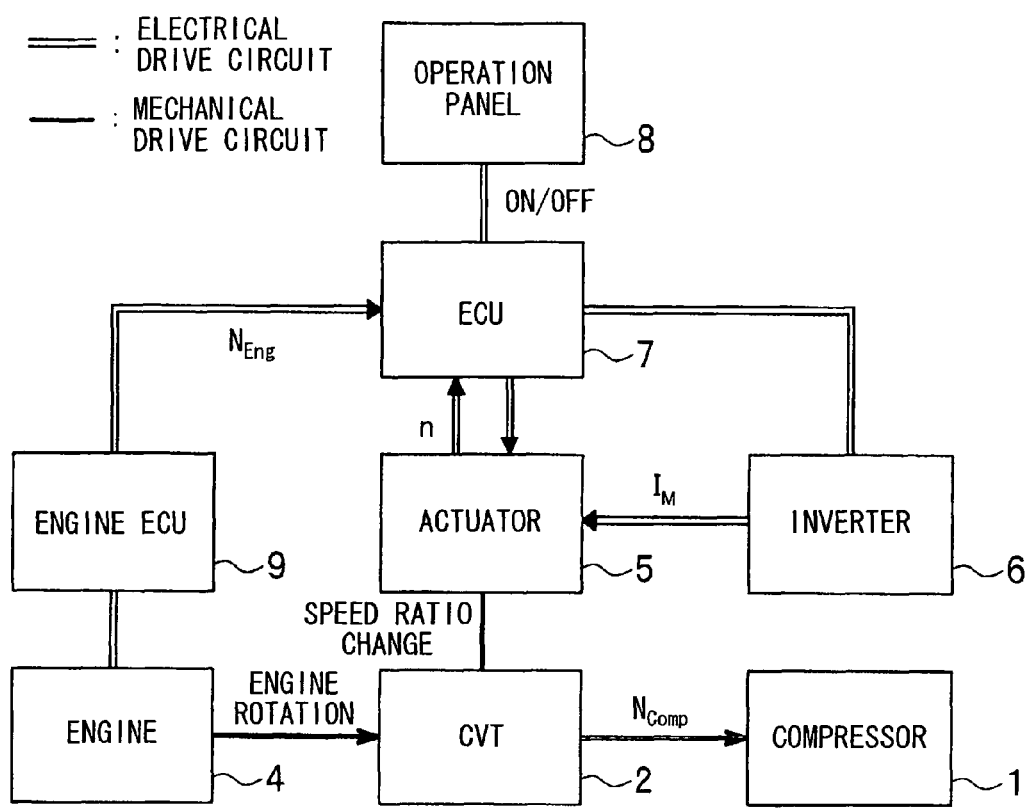
FIG. 16 is a block diagram showing a mechanical drive circuit and an electrical drive circuit in the vehicle air conditioning system of FIG. 15.

FIG. 15 is a schematic view showing a structure of the vehicle air conditioning system. FIG. 16 is a block diagram indicating a mechanical drive circuit and an electrical drive circuit in the vehicle air conditioning system. The compressor 1 is connected to an engine (internal combustion engine) 4 through the continuously variable transmission apparatus (CVT) 2, a pulley 3a and a belt 3b.

The compressor 1 can be, for example, a scroll compressor or any other type of compressor. The continuously variable transmission apparatus 2 transmits the rotational force of the engine (serving as a drive source) 4 to the compressor 1 upon changing the rotational speed to a desired rotational speed. The compressor 1 is driven by the output of the continuously variable transmission apparatus 2 to draw and compress refrigerant of a refrigeration cycle.

In the continuously variable transmission apparatus 2, when the rotational angle of the carrier 133 is changed through the adjusting mechanism 14, the location of the point of action of the input-side swing arm 15 relative to the output-side swing arm 16 is changed to change the input-to-output speed ratio. In the present embodiment, the adjusting mechanism 14 is driven by the electric actuator 5.

The electric actuator 5 is driven by a drive current (command value) $I_M$, which is outputted from an inverter 6. The inverter 6 is controlled by an electronic control unit (ECU) 7. Specifically, the electric actuator 5, the inverter 6 and the electronic control unit 7 form a drive control means for controlling the drive control operation of the adjusting mechanism 14.

The electronic control unit 7 includes a microcomputer of a known type, which includes a CPU, a ROM and a RAM, and its peripheral circuits. The electronic control unit 7 executes various arithmetic computations based on an air conditioning control program stored in the ROM and outputs a control signal to control the various devices connected to the output side thereof.

The electronic control unit 7 receives an encoder pulse n, which is outputted from the electric actuator 5, an air conditioning ON/OFF signal, which is outputted from an air conditioning operation panel 8, and an engine rotational speed $N_{Eng}$, which is outputted from an engine electronic control unit (engine ECU) 9. The air conditioning operation panel 8 is operable by the hand of the user.

When the electronic control unit 7 receives the air conditioning OFF signal from the air conditioning operation panel 8, the electronic control unit 7 controls the electric actuator 5 to set the input-to-output speed ratio of the continuously variable transmission apparatus 2 to 0 (zero). In this way, the drive force of the engine 4 is not transmitted to the compressor 1, and thereby the compressor 1 is held in the stop state (the air conditioning OFF).

When the electronic control unit 7 receives the air conditioning ON signal from the air conditioning operation panel 8, the electronic control unit 7 controls the electric actuator 5 to transmit the drive force of the engine 4 to the compressor 1. Specifically, the electronic control unit 7 executes the control operation shown in a flowchart of FIG. 17.

Figure 17:
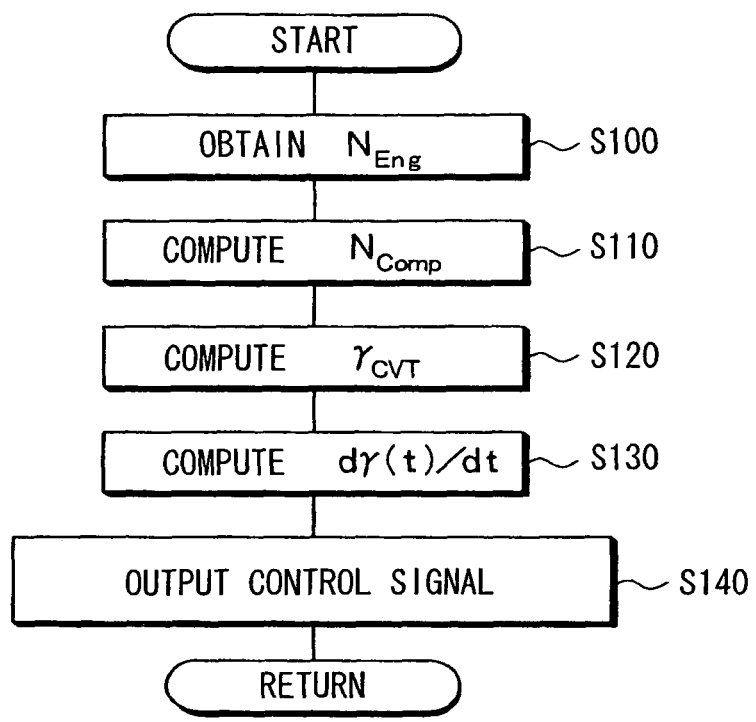
FIG. 17 is a flowchart showing a control operation of an electronic control unit shown in FIG. 16.

First of all, at step S100 of FIG. 17, the engine rotational speed $N_{Eng}$ is obtained from the engine electronic control unit 9.

Then, at step S110, the appropriate rotational speed $N_{comp}$ of the compressor 1 is computed based on the engine rotational speed $N_{Eng}$ and a heat load of the air conditioning system. The heat load can be obtained based on the temperature of a passenger compartment of the vehicle, an outside temperature at the outside of the passenger compartment, and the amount of solar radiation.

Then, at step S120, a target input-to-output speed ratio $\gamma_{CVT}$ of the continuously variable transmission apparatus 2 is computed based on the engine rotational speed $N_{Eng}$ and the appropriate rotational speed $N_{Comp}$. Specifically, the target input-to-output speed ratio $\gamma_{CVT}$ is computed with the following equation 1.

$$\gamma_{CVT} = N_{Comp}/N_{eng} \quad \text{(Equation 1)}$$

Then, at step S130, there is computed a rate of change of the input-to-output speed ratio $\gamma$ of the continuously variable transmission apparatus 2 over time, i.e., a gradient $d\gamma(t)/dt$ of the change in the input-to-output speed ratio $\gamma$ at the time of changing the input-to-output speed ratio $\gamma$ of the continuously variable transmission apparatus 2 from 0 (zero) to the target input-to-output speed ratio $\gamma_{CVT}$. Specifically, there is computed the gradient $d\gamma(t)/dt$, which does not cause the torque T, which is inputted to the continuously variable transmission apparatus 2, to exceed a normal operational torque $T_N$ of the continuously variable transmission apparatus 2.

Specifically, in the case where the gradient $d\gamma(t)/dt$ satisfies the following equation 2, the torque $T_{CVT}$, which is inputted to the continuously variable transmission apparatus 2, does not exceed the normal operational torque $T_N$ of the continuously variable transmission apparatus 2.

$$0 < \frac{d\gamma(t)}{dt} \leq \frac{T_N}{J \cdot \frac{2\pi}{60} \cdot N_{Eng}} \cdot e^{-\frac{T_{Comp}}{J \cdot \frac{2\pi}{60} \cdot N_{Eng}} \cdot t} \quad \text{(Equation 2)}$$

In the equation 2, J denotes a moment of inertia of the compressor 1, and $T_N$ denotes the normal operational torque of the continuously variable transmission apparatus 2. Furthermore, $T_{Comp}$ denotes a rated operational torque of the continuously variable transmission apparatus 2. The normal operational torque $T_N$ of the continuously variable transmission apparatus 2 is a torque, which is steadily determined under a predetermined environment (e.g., under a predetermined outside temperature environment) and is computed by the electronic control unit 7 in response to the state of the current environment.

It is desirable that a value selected from a range of the gradient $d\gamma(t)/dt$, which satisfies the condition of the equation 2, is a maximum value that does not exceed the condition of the equation 1. This is due to the following reason. That is, when the gradient $d\gamma(t)/dt$ gets larger, the speed change time $t_{CVT}$ becomes advantageously shorter.

The condition of the equation 2 is obtained as follows. First of all, the torque T, which is inputted to the continuously variable transmission apparatus 2, can be obtained with the following equation 3.

$$T = J \cdot \frac{d\left(\frac{2 \cdot \pi}{60} \cdot N_{Eng} \cdot \gamma(t)\right)}{dt} \cdot T_{Comp} \cdot \gamma(t) \quad \text{(Equation 3)}$$

With the above equation 3, a first order linear differential equation indicated in the following equation 4 can be obtained.

$$\frac{d\gamma(t)}{dt} + \frac{T_{Comp}}{J \cdot \left(\frac{2 \cdot \pi}{60} \cdot N_{Eng}\right)} \cdot \gamma(t) = \frac{T}{J \cdot \left(\frac{2 \cdot \pi}{60} \cdot N_{Eng}\right)} \quad \text{(Equation 4)}$$

When the first order linear differential equation of the equation 4 is solved for the condition of $\gamma=0$ at the time of $t=0$, the following equation 5 can be obtained.

$$\frac{d\gamma(t)}{dt} = \frac{T}{J \cdot \frac{2\pi}{60} \cdot N_{Eng}} \cdot e^{-\frac{T_{Comp}}{J \cdot \frac{2\pi}{60} \cdot N_{Eng}} \cdot t} \quad \text{(Equation 5)}$$

When the equation 5 is applied to the condition of $0 < T \leq T_N$, the condition of the above equation 2 is obtained.

Next, at step S140, the electric actuator 5 is controlled such that the target input-to-output speed ratio $\gamma_{CVT}$ is reached when the input-to-output speed ratio $\gamma$ of the continuously variable transmission apparatus 2 is changed at the gradient $d\gamma(t)/dt$. Specifically, the appropriate drive current $I_M$ is outputted from the inverter 6 to the electric actuator 5. Then, when the value of the encoder pulse n, which is outputted from the electric actuator 5, reaches an appropriate value, the output of the drive current $I_M$ from the inverter 6 to the electric actuator 5 is stopped.

Figure 18A:
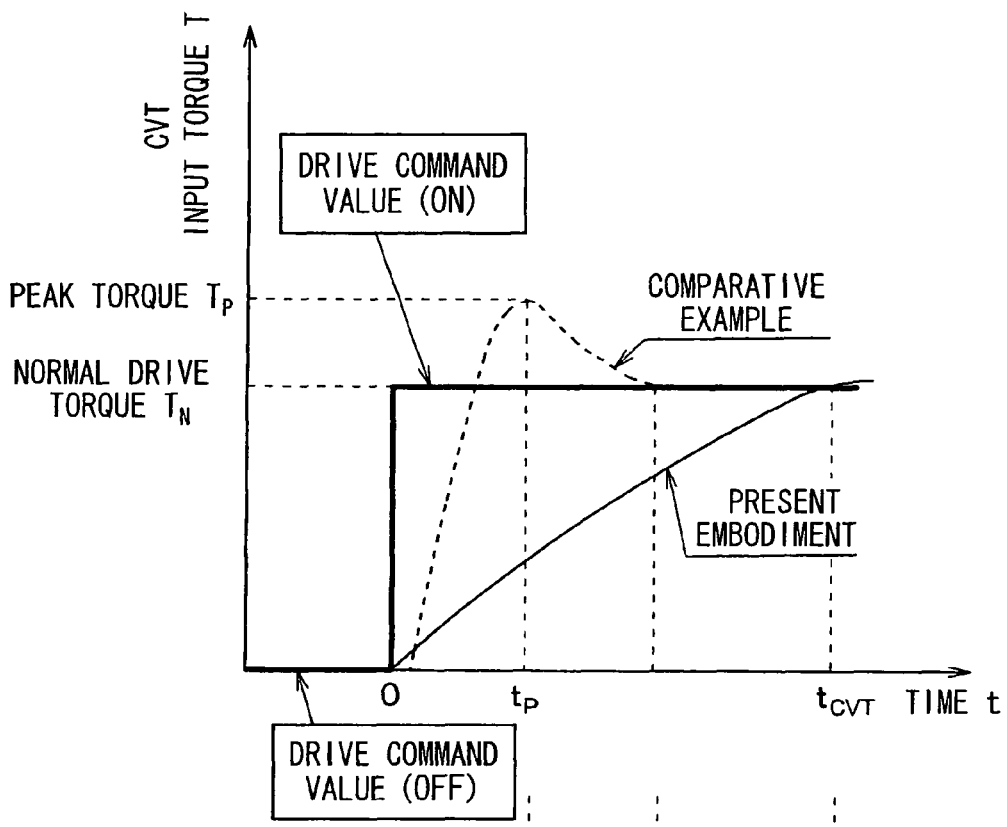
FIGS. 18A and 18B are diagrams for describing an operation according to the sixth embodiment.
Figure 18B:
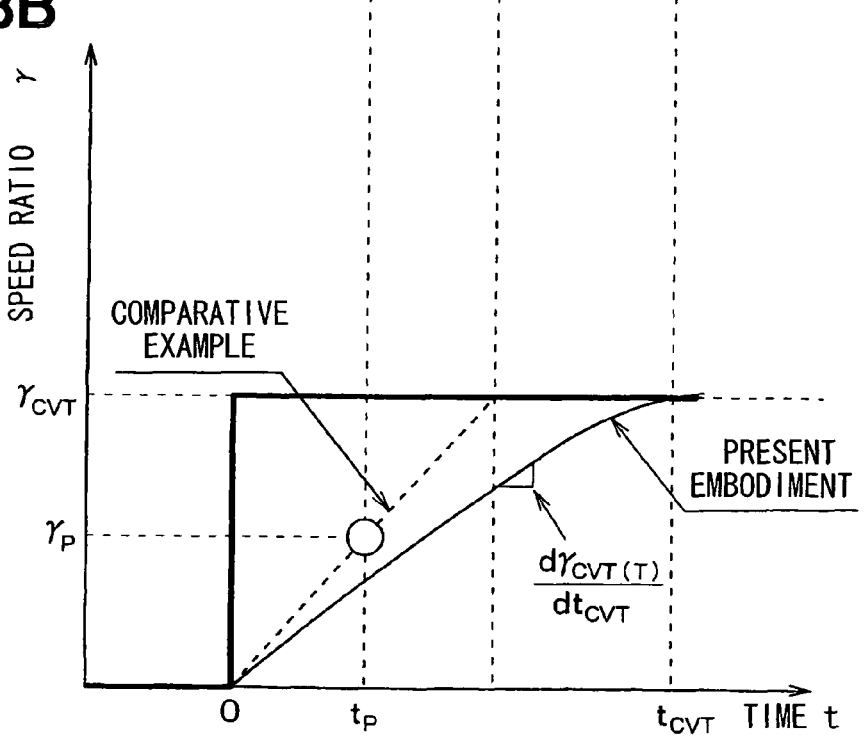

FIGS. 18A and 18B are diagrams for describing the operation at the time of executing the flowchart of FIG. 17. In FIGS. 18A and 18B, a solid line corresponds to the present embodiment, and a dotted line indicates a comparative example.

As shown in FIG. 18B, in the comparative example, the speed change time of the continuously variable transmission apparatus 2 (i.e., the time, which is required for the input-to-output speed ratio $\gamma$ to change from zero to the target input-to-output speed ratio $\gamma_{CVT}$) is shorter than that of the present embodiment. Therefore, the gradient $d\gamma(t)/dt$ of the change in the input-to-output speed ratio $\gamma$ becomes larger than that of the present embodiment.

As is understood in view of the above equation 5, the torque T, which is inputted to the continuously variable transmission apparatus 2, has the correlation with the gradient $d\gamma(t)/dt$. Specifically, when the gradient $d\gamma(t)/dt$ becomes small, the torque T, which is, inputted to the continuously variable transmission apparatus 2, becomes small. In contrast, when the gradient $d\gamma(t)/dt$ becomes large, the torque T, which is inputted to the continuously variable transmission apparatus 2, becomes large.

Therefore, in the comparative example, in which the gradient $d\gamma(t)/dt$ is large, a peak torque TP of the torque (CVT input torque) T, which is inputted to the continuously variable transmission (CVT) apparatus 2, exceeds the normal operational torque $T_N$, as indicated in FIG. 18A.

When the torque of the continuously variable transmission apparatus 2 exceeds the normal operational torque, the load of the engine 4 becomes large. Therefore, in the worst case, the engine 4 is stopped, i.e., is stalled. Thus, a countermeasure, such as increasing of the rotational speed of the engine 4 in response to the start of the compressor 1, needs to be taken.

With respect to this point, according to the present embodiment, the speed change time $t_{CVT}$ of the continuously variable transmission apparatus 2 is longer than that of the comparative example, and the gradient $d\gamma(t)/dt$ of the change in the input-to-output speed ratio $\gamma$ is smaller than that of the comparative example. Therefore, it is possible to maintain the torque T, which is inputted to the continuously variable transmission apparatus 2, equal to or smaller than the normal operational torque $T_N$. As a result, the load of the engine 4 at the time of starting the compressor 1 does not become large.

Furthermore, in the present embodiment, the input-to-output speed ratio $\gamma$ of the continuously variable transmission apparatus 2 can be held to 0 (zero). Therefore, the compressor 1 can be started or stopped without using a clutch. Thereby, it is possible to limit occurrence of disadvantages, such as generation of operational noises of the clutch at the time of changing between the ON state and the OFF state of the clutch, and the fluctuation of the load of the engine 4, which would be encountered at the time of starting or stopping the compressor 1 by using the clutch. As a result, the user will not have annoying feeling at the time of starting or stopping the compressor 1.

Furthermore, the rotational speed of the compressor 1 is adjusted with the continuously variable transmission apparatus 2, so that the compressor 1 can be driven at the appropriate rotational speed without the influence of the rotational speed of the engine 4.

Now, modifications of the above embodiments will be described.

In each of the above embodiments, the continuously variable transmission apparatus of the present invention is applied to the compressor of the refrigeration cycle. However, the continuously variable transmission apparatus of the present invention can be applied to various rotating machines.

Furthermore, in each of the above embodiments, the location of the input-side swing arm is adjusted to adjust the location of the point of action of the input-side swing arm. Alternatively, the location of the point of action may be adjusted by adjusting the location of the output-side swing arm.

Furthermore, in each of the above embodiments, the pin of the output-side swing arm is received in the groove of the input-side swing arm, so that the output-side swing arm is urged by the input-side swing arm. However, the present invention is not limited to this construction. For example, a predetermined part of the output-side swing arm may be engaged with the side surface of the input-side swing arm, so that the output-side swing arm is urged by the input-side swing arm.

Furthermore, in the fifth embodiment, the bypass shaft 30 is provided to the continuously variable transmission apparatus of the first embodiment. However, the present invention is not limited to this. For example, the bypass shaft 30 may be provided to the continuously variable transmission apparatus of any one or more of the second to fourth embodiments.

Furthermore, in the sixth embodiment, the gradient $d\gamma(t)/dt$, which satisfies the condition of the equation 1, is selected. However, the present invention is not limited to this. That is, the condition for selecting the gradient $d\gamma(t)/dt$ may be changed in various ways.

Additional advantages and modifications will readily occur to those skilled in the art. The invention in its broader terms is therefore not limited to the specific details, representative apparatus, and illustrative examples shown and described.

What is claimed is:

1. A continuously variable transmission apparatus comprising:
    an input shaft that is adapted to be rotated by an external rotational force;
    an output shaft that is adapted to be rotated by a force transmitted from the input shaft;
    an input-side swing arm that is adapted to be swung about a swing axis thereof by the force transmitted from the input shaft;
    a support member, by which the input-side swing arm is swingably supported;
    a rotation-to-swing converting mechanism that converts a single directional rotational motion of the input shaft into a swing motion of the input-side swing arm;
    an output-side swing arm that is adapted to be swung about a swing axis thereof when the output-side swing arm is urged by a corresponding part of the input-side swing arm;
    a swing-to-rotation converting mechanism that converts a swing motion of the output-side swing arm into a single directional rotational motion of the output shaft; and
    an adjusting mechanism that adjusts an amount of swing of the output-side swing arm by changing a location of a point of action of the input-side swing arm relative to the output-side swing arm in a radial direction of the swing axis of the input-side swing arm.

2. The continuously variable transmission apparatus according to claim 1, wherein:
the rotation-to-swing converting mechanism includes a drive pin, which drives the input-side swing arm;
the input-side swing arm includes a first groove, which receives the drive pin;
the swing axis of the output-side swing arm is displaced from an imaginary swing center line, which bisects a swing angular range of the input-side swing arm, in an axial view taken in an axial direction of the swing axis of the output-side swing arm; and
the point of action of the input-side swing arm is located on a side of the first groove where the swing axis of the output-side swing arm is located.

3. The continuously variable transmission apparatus according to claim 2, wherein:
the output-side swing arm includes a pin, which is urged by the input-side swing arm when the output-side swing arm is swung by the input-side swing arm;
the input-side swing arm includes a second groove, which receives the pin; and
the first groove and the second groove are configured to extend linearly and are non-parallel to each other.

4. The continuously variable transmission apparatus according to claim 1, wherein the adjusting mechanism is adapted to change a relative position of the support member relative to the output-side swing arm.

5. The continuously variable transmission apparatus according to claim 4, wherein:
the rotation-to-swing converting mechanism is a planetary gear mechanism, which includes a sun gear, a planetary gear, a carrier and an internal gear;
the input-side swing arm is swingably supported by the carrier and is adapted to be swung through rotation of the planetary gear;
the support member includes the carrier; and
the adjusting mechanism is adapted to fix a rotational angle of the carrier at a corresponding angle within a predetermined angular range.

6. The continuously variable transmission apparatus according to claim 1, wherein:
the rotation-to-swing converting mechanism includes:
an eccentric cam that is connected to the input shaft; and
a resilient member that urges the output-side swing arm against the input-side swing arm;
the adjusting mechanism is adapted to fix a rotational angle of the support member relative to an axis of the eccentric cam at a corresponding angle within a predetermined angular range.

7. The continuously variable transmission apparatus according to claim 5, further comprising a lever crank mechanism, which is swingably connected to the planetary gear, wherein:
the lever crank mechanism includes a plurality of connecting rods;
the output-side swing arm is swung when the output-side swing arm is urged by a corresponding part of a predetermined one of the plurality of connecting rods; and
the predetermined one of the plurality of connecting rods is formed as the input-side swing arm.

8. The continuously variable transmission apparatus according to claim 1, wherein:
the adjusting mechanism is adapted to adjust the location of the point of action of the input-side swing arm to a zero point location where a radial distance, which is measured from the swing axis of the input-side swing arm to the location of the point of action in the radial direction of the swing axis, is minimized to limit the swing motion of the output-side swing arm when the input-side swing arm is swung by the force transmitted from the input shaft; and
the input-side swing arm includes a tolerance absorbing portion, which is adapted to absorb a positional tolerance of the point of action of the input-side swing arm when the location of the point of action of the input-side swing arm is adjusted to the zero point location by the adjusting mechanism.

9. The continuously variable transmission apparatus according to claim 1, further comprising:
a differential gear mechanism, which is adapted to receive the rotational motion that is converted through the swing-to-rotation converting mechanism; and
a bypass shaft, which conducts the rotational motion of the input shaft to the differential gear mechanism while bypassing the rotation-to-swing converting mechanism, the input-side swing arm, the output-side swing arm and the swing-to-rotation converting mechanism;
the rotation-to-swing converting mechanism, the input-side swing arm, the output-side swing arm and the swing-to-rotation converting mechanism cooperate together to form a continuously variable transmission mechanism; and
the differential gear mechanism is adapted to conduct the rotation, which is conducted from the continuously variable transmission mechanism and the bypass shaft, to the output shaft.

10. The continuously variable transmission apparatus according to claim 9, wherein the input shaft, the output shaft and the bypass shaft are coaxial to each other.

11. The continuously variable transmission apparatus according to claim 9, further comprising a coupling and decoupling mechanism, which enables or disables conduction of the rotation of the input shaft to the bypass shaft, wherein an input-to-output speed ratio of the continuously variable transmission apparatus changes when the coupling and decoupling mechanism enables or disables the conduction of the rotation of the input shaft to the bypass shaft.

12. The continuously variable transmission apparatus according to claim 11, wherein the coupling and decoupling mechanism is a clutch mechanism.

13. The continuously variable transmission apparatus according to claim 11, further comprising a first rotation limiting mechanism, which is adapted to limit a rotational direction of the bypass shaft, wherein:
the first rotation limiting mechanism enables rotation of the bypass shaft in a direction, which is opposite from that of the rotation that is conducted from the continuously variable transmission mechanism to the differential gear mechanism; and
the first rotation limiting mechanism disables rotation of the bypass shaft in a direction, which is the same as that of the rotation that is conducted from the continuously variable transmission mechanism to the differential gear mechanism.

14. The continuously variable transmission apparatus according to claim 13, wherein:
the swing-to-rotation converting mechanism includes:
a gear mechanism that conducts the rotation of a shaft of the output-side swing arm to the differential gear mechanism; and a second rotation limiting mechanism that limits the rotation, which is conducted from the shaft of the output-side swing arm to the gear mechanism, to one direction;

the gear mechanism is constructed such that a direction of the rotation, which is conducted from the shaft of the output-side swing arm to the gear mechanism through the second rotation limiting mechanism, and a direction of the rotation, which is conducted from the gear mechanism to the differential gear mechanism, are opposite to each other; and the direction of the rotation, which is limited by the second rotation limiting mechanism, is the same as the direction of the rotation, which is limited by the first rotation limiting mechanism.

15. The continuously variable transmission apparatus according to claim 9, wherein the differential gear mechanism includes:

a carrier, to which the rotation is conducted from the continuously variable transmission mechanism;

a sun gear, to which the rotation is conducted from the bypass shaft; and an internal gear, which conducts the rotation to the output shaft.

16. An air conditioning system comprising:

the continuously variable transmission apparatus of claim 1;

a compressor, which is driven by an output of the continuously variable transmission apparatus to suction and compress refrigerant; and means for controlling an operation of the adjusting mechanism, wherein:

the adjusting mechanism is adapted to adjust the location of the point of action of the input-side swing arm to a zero point location where a radial distance, which is measured from the swing axis of the input-side swing arm to the location of the point of action in the radial direction of the swing axis, is minimized to limit the swing motion of the output-side swing arm when the input-side swing arm is swung by the force transmitted from the input shaft; and the means for controlling the operation of the adjusting mechanism controls the adjusting mechanism at time of starting the compressor such that a torque, which is exerted at the continuously variable transmission apparatus, becomes equal to or smaller than a normal operational torque of the continuously variable transmission apparatus.

17. The air conditioning system according to claim 16, wherein the means for controlling the operation of the adjusting mechanism computes a rate of change of an input-to-output speed ratio of the continuously variable transmission apparatus over time at time of changing the input-to-output speed ratio from zero to a target input-to-output speed ratio and drives the adjusting mechanism based on the computed rate of change of the input-to-output speed ratio of the continuously variable transmission apparatus over time at the time of starting the compressor.

18. The air conditioning system according to claim 17, wherein the means for controlling the operation of the adjusting mechanism computes the rate of change of the input-to-output speed ratio of the continuously variable transmission apparatus over time in a manner that satisfies a condition of the following equation:

$$0 < \frac{d\gamma(t)}{dt} \leq \frac{T_N}{J \cdot \frac{2\pi}{60} \cdot N_{Eng}} \cdot e^{-\frac{T_{Comp}}{J \cdot \frac{2\pi}{60} \cdot N_{Eng}} \cdot t}$$

where:

$\gamma$ denotes the input-to-output speed ratio of the continuously variable transmission apparatus;

$d\gamma(t)/dt$ denotes the rate of change of the input-to-output speed ratio of the continuously variable transmission apparatus over time;

J denotes a moment of inertia of the compressor;

$T_N$ denotes the normal operational torque of the continuously variable transmission apparatus;

$N_{Eng}$ denotes a rotational speed of an external drive source, which drives the input shaft; and $T_{Comp}$ denotes a rated operational torque of the continuously variable transmission apparatus.

* * * * *